US011756322B2

(12) United States Patent
McConnell et al.

(10) Patent No.: US 11,756,322 B2
(45) Date of Patent: *Sep. 12, 2023

(54) SYSTEMS AND METHODS FOR IDENTIFYING AND AUTHENTICATING ARTISTIC WORKS

(71) Applicant: Great Masters Art Authentication, LLC, Rancho Santa Fe, CA (US)

(72) Inventors: Curtis G. McConnell, Carlsbad, CA (US); Doug Komen, San Diego, CA (US); Daniel I. Bodenheimer, Del Mar, CA (US)

(73) Assignee: GREAT MASTERS ART AUTHENTICATION, LLC, Rancho Santa Fe, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 17/404,429

(22) Filed: Aug. 17, 2021

(65) Prior Publication Data

US 2021/0374449 A1 Dec. 2, 2021

Related U.S. Application Data

(63) Continuation of application No. 16/754,875, filed as application No. PCT/US2018/055076 on Oct. 9, 2018, now Pat. No. 11,113,554.

(Continued)

(51) Int. Cl.
*G06T 7/00* (2017.01)
*G06V 30/224* (2022.01)
(Continued)

(52) U.S. Cl.
CPC ........ *G06V 30/2253* (2022.01); *G06V 10/143* (2022.01); *G06V 20/10* (2022.01); *H04N 23/54* (2023.01)

(58) Field of Classification Search
CPC .... G06K 9/2018; G06K 9/00664; G06K 9/22; H04N 5/2253; C12N 15/1079;
(Continued)

(56) References Cited

U.S. PATENT DOCUMENTS

| 11,113,554 B2 | 9/2021 | McConnell et al. |
| 2007/0247317 A1 | 10/2007 | Farrell |

(Continued)

FOREIGN PATENT DOCUMENTS

WO 2007072044 A1 6/2007

OTHER PUBLICATIONS

Deloitte ArtTactic, Art & Finance Report 2016, 4th Edition, 160 pages.

(Continued)

*Primary Examiner* — Phuoc H Doan
(74) *Attorney, Agent, or Firm* — Perkins Coie LLP

(57) ABSTRACT

Disclosed are systems, devices and methods for quantifying unique features of an object such as an artistic work to identify and authenticate the object and specific characteristics thereof using multi-spectral diagnostic characterization techniques and analytical algorithms. In some aspects, a method for creating an identification for an object includes acquiring image data of an object in two or more electromagnetic spectrums along a coordinated array of sample regions of the object; analyzing the acquired image data to produce a quantitative data set including specific characteristics of the object associated with the two or more electromagnetic spectrums for each sample region; generating a digital identification associated with a unique data fingerprint, based on the specific characteristics, in which the digital identification solely corresponds to the object; and storing the generated digital identification.

20 Claims, 8 Drawing Sheets

Related U.S. Application Data

(60) Provisional application No. 62/569,932, filed on Oct. 9, 2017.

(51) Int. Cl.
*G06V 10/143* (2022.01)
*G06V 20/10* (2022.01)
*H04N 23/54* (2023.01)

(58) Field of Classification Search
CPC ..... A61C 7/002; A61C 9/0053; G06T 7/0012; G06N 20/00
See application file for complete search history.

(56) References Cited

U.S. PATENT DOCUMENTS

| | | | |
|---|---|---|---|
| 2008/0212840 A1* | 9/2008 | Shalom | G01B 11/24 382/108 |
| 2009/0154778 A1 | 6/2009 | Lei et al. | |
| 2010/0097208 A1 | 4/2010 | Rosing et al. | |
| 2011/0127432 A1 | 6/2011 | Federici et al. | |
| 2012/0175866 A1 | 7/2012 | Kisters | |
| 2013/0183924 A1 | 7/2013 | Saigh et al. | |
| 2014/0058198 A1 | 2/2014 | St. George et al. | |
| 2015/0262461 A1 | 9/2015 | Richter et al. | |
| 2017/0263011 A1* | 9/2017 | Yalniz | G06V 10/141 |
| 2020/0311452 A1 | 10/2020 | Mcconnell et al. | |

OTHER PUBLICATIONS

Extended European Search Report dated Jun. 8, 2021 in European Patent Application No. 18866860.2, 13 pages.
International Search Report and Written Opinion dated Jan. 8, 2019 in International Application No. PCT/US18/55076, 12 Pages.
International Search Report and Written Opinion dated Jul. 14, 2022 in International Patent Application No. PCT/US22/24484, 20 pages.

* cited by examiner

SYSTEMS AND METHODS FOR IDENTIFYING AND AUTHENTICATING ARTISTIC WORKS

CROSS-REFERENCE TO RELATED APPLICATIONS

This patent document is a continuation of U.S. patent application Ser. No. 16/754,875, entitled "SYSTEMS AND METHODS FOR IDENTIFYING AND AUTHENTICATING ARTISTIC WORKS", filed on Apr. 9, 2020, which is a U.S. National Stage Application of International Patent Application No. PCT/US18/55076 entitled "SYSTEMS AND METHODS FOR IDENTIFYING AND AUTHENTICATING ARTISTIC WORKS", filed on Oct. 9, 2018, which claims priorities to and benefits of U.S. Provisional Patent Application No. 62/569,932 entitled "SYSTEMS AND METHODS FOR IDENTIFYING AND AUTHENTICATING ARTISTIC WORKS" filed on Oct. 9, 2017. The entire contents of the aforementioned patent applications are incorporated by reference as part of the disclosure of this patent document.

TECHNICAL FIELD

This patent document relates to quantitative imaging and chemical analysis techniques for quantitative analysis of physical objects including artistic works, high-value artifacts, collectibles, luxury products and high-end consumer goods.

BACKGROUND

Art is the manifestation of human expression or creative skill and imagination, typically in a visual format such as painting or sculpture, an audio format such as music, or a mixture of both such as a performance, in which the produced artistic works are for appreciation and enjoyment for their attributes, beauty, message, meaning, significance, symbolism, and/or other aspects.

Some of the oldest documented forms of art are visual arts that represent creation of images and objects. Visual artistic works include paintings, sculptures, printmaking, photography, and other visual media. Paintings are among the most common in the visual or fine arts. A painting is typically assembled by applying a form of paint, pigment or other color medium to a support surface, e.g., such as a fabric base or a wooden panel. The support surface typically includes a ground layer, which provides a smooth surface for receiving the paint and absorbing excess binding media of the paint. In some instances, the top layers of a painting have a coating applied to provide saturation and to protect the paint underneath from dirt, abrasion and moisture.

Paintings, particularly those produced by the great artistic masters (e.g., like Da Vinci, Raphael, van Gogh, O'Keefe, Picasso, Warhol and many more), make up the majority of the most famous (e.g., most recognizable) and most expensive artistic works in the world. For example, "Interchange" by Willem de Kooning is the most expensive painting sold in the art world at around $300 million, followed by Paul Cezanne's "The Card Players" and Paul Gauguin's "Nafea Faa Ipoipo" at around $250 million and $210 million, respectively. Many of the master paintings are decades or centuries old. As a consequence, challenges arise in protecting and preserving these artistic works, which can affect their value.

SUMMARY

Disclosed are systems, devices and methods for quantifying unique features of artistic works and valuable articles to identify and authenticate the works and articles by their specific physical characteristics using noninvasive hyperspectral and/or multi-spectral diagnostic characterization techniques and analytical algorithms.

In some aspects, a system for identifying and authenticating an object includes an image data acquisition platform to acquire image data from an object in multiple electromagnetic (EM) spectrums along a coordinated array of sample regions of the object; a data processing device, in communication with the image data acquisition platform, to analyze the acquired image data of the object and produce a quantitative data set that represents specific characteristics of the object associated with the multiple EM spectrums for each sample region, in which the data processing device is configured to (i) identify the object by creating a digital fingerprint that solely corresponds to the object and includes the quantitative data set, and generate an identification corresponding to the digital fingerprint, in which the identification includes an alphanumeric string that is displayable as text, graphic, or audio to identify the object, or (ii) authenticate the object by evaluating the quantitative data set produced for the object by comparing with previously-generated quantitative data sets corresponding to other objects in order to determine an authenticity of the object to be the same object as one of the other objects; and one or more data storage devices, in communication with the data processing device, to store the acquired data and analyzed data.

In some aspects, a method for creating an identification for an object includes acquiring image data of an object in multiple electromagnetic (EM) spectrums along a coordinated array of sample regions of the object; analyzing the acquired image data to produce a quantitative data set that represents specific characteristics of the object associated with the multiple EM spectrums for each sample region; creating a digital fingerprint that includes the quantitative data set, in which the digital fingerprint solely corresponds to the object; generating an identification corresponding to the digital fingerprint, in which the identification includes an alphanumeric string that is displayable as text, graphic, or audio (or any combination thereof) to identify the object; and storing the digital fingerprint and corresponding identification.

In some aspects, a method for authenticating an object includes acquiring image data of an object in multiple electromagnetic (EM) spectrums at selected sample regions among a coordinated array of sample regions of the object; analyzing the acquired image data to produce a quantitative data set that represents specific characteristics of the object associated with the multiple EM spectrums for each selected sample region; and evaluating the quantitative data set produced for the object by comparing with previously-generated quantitative data sets associated with other objects stored in a database to determine an authenticity of the object to be the same object as one of the other objects, in which the previously-generated quantitative data sets are each included in a digital fingerprint that solely corresponds to the respective other object, in which the previously-generated quantitative data sets each represents specific characteristics analyzed from images acquired in multiple EM spectrums corresponding to the other objects.

In some aspects, a method for creating an identification for an object includes acquiring image data of an object in multiple light spectrums along a coordinated array of sample regions of the object; analyzing the acquired image data to produce a quantitative data set including specific characteristics of the object associated with the multiple light spectrums for each sample region; generating a digital identification comprising a unique digital fingerprint, based on the specific characteristics, in which the digital identification solely corresponds to the object; and storing the generated digital identification. In some implementations of the method, for example, the multiple light spectrums include two or more of an infrared (IR) spectrum, a visible light spectrum, an ultraviolet (UV) spectrum, or an X-ray spectrum. In some implementations of the method, for example, the method further includes, or alternatively includes, acquiring hyperspectral image data of the object in at least some of two or more light spectrums along the coordinated array of sample regions; and analyzing the acquired hyperspectral image data to produce hyperspectral data included in the produced quantitative data set. In such implementations, the unique digital fingerprint is based on the specific characteristics of the object derived from the produced quantitative data set including the hyperspectral data.

In some aspects, a method for authenticating an object includes acquiring image data of an object in multiple light spectrums at selected sample regions of the object; analyzing the acquired image data to produce a quantitative data set including specific characteristics of the object associated with the multiple light spectrums for each selected sample region; evaluating the quantitative data set produced for the object by comparing with previously-generated digital identifications stored in a database to create a validation score, in which the previously-generated digital identifications each comprise a unique multi-spectral fingerprint based on the specific characteristics analyzed from multi-spectral images of corresponding objects, and in which the validation score is indicative of a sufficiency of data to make a comparison of the quantitative data set with the previously-generated digital identifications; and when the validation score exceeds a predetermined threshold, determining a verdict of authenticity of the object to be authentic, inauthentic, or incomplete as matched to a previously-generated identification. In some implementations of the method, for example, when the validation score does not exceed the predetermined threshold, the method includes repeating the acquiring image data to obtain additional multi-spectral image data.

In some aspects, a system for identifying and authenticating an object includes a data acquisition platform to acquire data from an object; a data processing device, in communication with the data acquisition platform, to analyze the acquired data of the object and produce a quantitative data set including specific characteristics of the object based on the analyzed data, in which the data processing device is configured to identify the object by generating a digital identification based on the specific characteristics that solely corresponds to the object, or to authenticate the object by evaluating the quantitative data set produced for the object by comparing with previously-generated digital identifications to determine an authenticity; and one or more data storage devices, in communication with the data processing device, to store the acquired data and analyzed data. In some implementations of the system, for example, the data acquisition platform includes a multi-spectral imaging system configured to acquire image data of the object in multiple light spectrums along a coordinated array of sample regions of the object. In such implementations, for example, the system is configured to determine the authenticity by evaluating the quantitative data set produced for the object by comparing with previously-generated digital identifications stored in the one or more data storage devices to create a validation score, in which the previously-generated digital identifications each comprise a unique multi-spectral fingerprint based on the specific characteristics analyzed from multi-spectral images of corresponding objects, and in which the validation score is indicative of a sufficiency of data to make a comparison of the quantitative data set with the previously-generated digital identifications, and when the validation score is determined to exceed a predetermined threshold, determining a verdict of authenticity of the object to be authentic, inauthentic, or incomplete as matched to a previously-generated identification, and when the validation score is determined to not exceed the predetermined threshold, repeating acquisition of image data to obtain additional multi-spectral image data. In some implementations, for example, the system can further include an output device, in communication with the data processing device, to display at least some of the acquired data, the processed data, or both.

The subject matter described in this patent document can be implemented in specific ways that provide one or more of the following features.

DETAILED DESCRIPTION

Figure 1A:
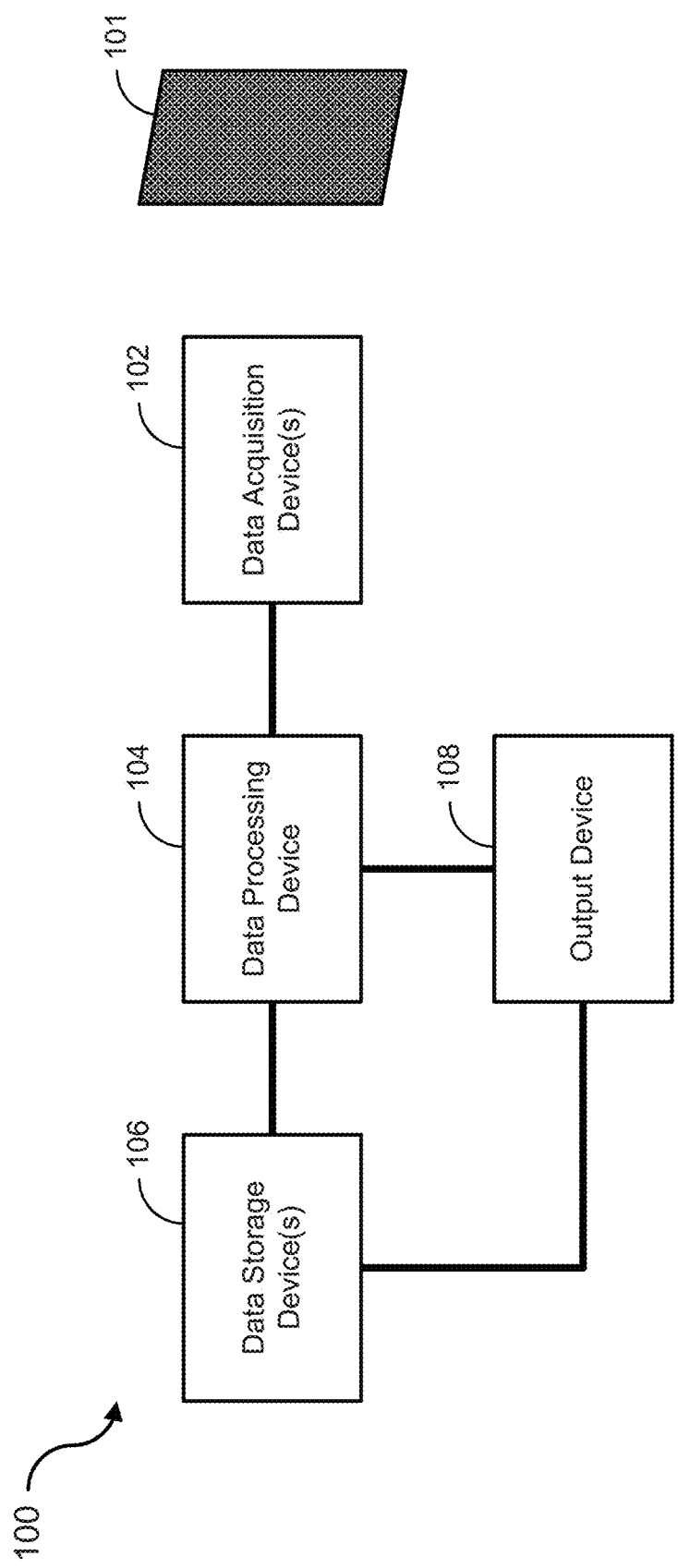
FIG. 1A shows a diagram of an example embodiment of multi-modal art identification and/or authentication system in accordance with the present technology.

The market for art is typically managed as a commercial venture in which the art work is bought, sold, or traded. However, because a work of art is not a commodity in an ordinary sense, it is challenging to assign an agreed and stable monetary value in the marketplace. For example, the assigned value of an art work can fluctuate radically and suddenly, which may be due to external influences of collectors, dealers, curators, critics, connoisseurs or other. The influences and assessments of these actors may often outweigh other aspects including historic, intellectual, and aesthetic values associated with the artistic work.

Presently, the global art marketplace is around $65 billion and growing rapidly and is projected to become a common asset class for diversified investment portfolios, i.e., artistic works to be included among stocks, bond, real estate, etc. in a portfolio. However, the art market currently lacks reliable tools, techniques and established protocols for identifying and authenticating artistic works; and thus, there is presently no effective solution for avoiding fakes and frauds from entering and adversely affecting the market. For example, there are no effective quantitative methods for uniquely identifying a work of art with statistical surety or reliability or free of any human opinion regarding its unique identification. According to a 2016 report on art and finance by Deloitte, "Authenticity related issues are a unified threat to the art market: around 75 percent of all stakeholders agree that "authenticity, lack of provenance, forgery, and attribution" are the biggest threats to credibility in the art market."

As such, investment in fine art, such as paintings and sculpture, continues to be a leap of faith predicated on expert opinions rather than scientific fact. For example, there are many known works of art that have been bought and sold with the blessing of world renown experts that have both later been proven to be fakes. Also, for example, there are other known works of art that continue to be passed as authentic even though they have been studied and proven to be fake, but due to non-disclosure agreements, they are not commonly known to be illegitimate.

The art market and society as a whole would greatly benefit from scientific and technical authentication techniques. For example, with proper scientific and technology-based techniques to identify and authenticate artist works, artists and art lovers would be brought confidence and security that an artistic work is safe from forgery or deception. Furthermore, it provides a level of risk mitigation especially in the case of future "experts" opinions who could shed doubt on the authenticity of a work and thereby "burn" or destroy its value. Scientific and technology-based authentication allows investors to protect their assets through indisputable evidence and provides the foundation of a digital audit trail for art. Authentication eliminates the major risk to value that is a major concern for art investors.

Some recent efforts have been made to try to use artificial intelligence to analyze and compare visible spectrum images to identify art. These efforts have not resulted in reliable repeatable results. Furthermore, these efforts do not provide statistical surety that work of art is not an accurate copy of an art work. These software-exclusive technologies, while helpful for identifying obvious fakes or copies, do little to effectively secure a work of art. Moreover, analyzing an object with statistical certainty requires interrogation of more data than just the visible light spectrum. For example, analysis of an object's 'nonvisible' characteristics allows identification of features that are unseen, thereby enabling identification of unique physical features of the object that could not be duplicated by potential forgers.

Disclosed are systems, devices and methods for quantifying unique features of artistic works and valuable articles to identify and authenticate the works and articles by their specific physical characteristics using noninvasive hyper-spectral and/or multi-spectral diagnostic characterization techniques and analytical algorithms. The disclosed diagnostic characterization techniques include multi-spectral imaging methods that acquire images of an object, such as an artistic work, in multiple, distinct frequency bands of the electromagnetic (EM) spectrum, e.g., corresponding to the frequency bands of the infrared (IR) spectrum, the visible light spectrum, the ultraviolet (UV) spectrum, and/or the X-ray spectrum. Additionally or alternatively, the disclosed diagnostic characterization techniques include hyperspectral imaging methods that acquire images of the object in a plurality of narrow frequency bands spanning a wider band in multiple regions of the electromagnetic spectrum.

For example, the disclosed diagnostic characterization techniques can acquire multi-spectral images that include multiple images at a certain point or region of the object (e.g., aimed at a coordinate), where each image is captured within a particular frequency band of an EM spectral group for two or more EM spectral groups. As an example, multi-spectral imaging of the certain point or region of the object could include acquiring (1) an image within the IR spectrum (near IR (NIR), short-wavelength IR (SWIR), mid-wavelength IR (MWIR), long-wavelength IR (LWIR), far IR (FIR), or a combination thereof), (2) an image within the visible light spectrum, (3) an image within the UV spectrum (e.g., near UV, middle UV, extreme UV, or a combination thereof), and (4) an image within the X-ray spectrum (e.g., soft X-ray, hard X-ray, or both), or any combination thereof that includes at least two EM spectral images. The acquired images in the multiple EM spectra for the certain point or region of the object are processed to form a multi-spectral image of the object at that certain point or region. The multi-spectral image acquisition includes acquiring additional multi-spectral images at additional points or regions of the object.

The disclosed diagnostic characterization techniques can implement hyperspectral imaging in addition or alternatively to multi-spectral imaging. For example, the disclosed diagnostic characterization techniques can acquire hyper-spectral images that include multiple images at a certain point or region of the object (e.g., aimed at a coordinate), where each image is captured within one or more narrow frequency bands within an EM spectral group or groups. As a first example, hyperspectral imaging of the certain point or region of the object could include acquiring (1) an image at 1.1 μm and/or 1.7 μm within the IR spectrum, and/or (2) an image at 440 to 465 nm (an example narrow blue light band) and/or 510 to 535 nm (an example narrow green light band) within the visible light spectrum. As a second example, hyperspectral imaging of the certain point or region of the object could include acquiring (1) an image at 370 nm, 340 nm, and/or 300 nm within the UV spectrum, and/or (2) at 1.1 μm and/or 2.4 μm within the IR spectrum. As a third example, hyperspectral imaging of the certain point or region of the object could include acquiring (1) an image at 370 nm, 340 nm, and/or 300 nm within the UV spectrum, and/or (2) an image at 0.7 nm and/or 1 nm within the X-ray spectrum. In each of these examples and others, additional narrow-band images in other EM spectral groups at the certain point or region of the object can be included. The acquired images within the plurality of narrow bands across multiple EM spectral groups for the certain point or region of the object are processed to form a hyperspectral image of the object at that certain point or region. The hyperspectral image acquisition includes acquiring additional hyperspectral images at additional points or regions of the object.

While the disclosed embodiments are described herein primarily based on quantifying unique features of artistic works, such as paintings, sculptures, drawings, photography, printed material, etc., to facilitate understanding of the underlying concepts, it is understood that the disclosed embodiments can also include quantifying unique features for identification and/or authentication of other physical objects like luxury or high-end goods, such as wine, jewelry, clothing, and the like.

In some embodiments in accordance with the present technology, a unique digital identification of an artistic work, referred to as a "fingerprint" or "digital fingerprint," is produced based on multi-spectral and/or hyperspectral data for use in identification and/or authentication of the artistic work. The fingerprint, also referred to as a unique multiple EM spectral fingerprint, includes a time series of one or more data blocks each having (1) a quantitative data set of the processed multi-spectral and/or hyperspectral imaging data that was acquired at a particular time for the specific object (e.g., artistic work, historic artifact, collectible, etc.), in which the fingerprint has a digital identification (ID) associated to it for referencing the object to its unique multiple EM spectral fingerprint, where the ID can be an alphanumeric string representable as text ID, graphic ID, and/or audio ID). For example, the fingerprint can include a first data block associated with a first quantitative data set of processed multi-spectral and/or hyperspectral imaging data acquired from the object at a first point in time, a second data block associated with a second quantitative data set of processed multi-spectral and/or hyperspectral imaging data acquired from the object at a second, subsequent point in time, etc. A fingerprint includes at least one data block. Notably, for fingerprints including multiple data blocks, the fingerprint can organize the data blocks in any particular order, e.g., as part of data security protocol. The fingerprint includes a data set that is completely unique to a particular piece of art, in which, in some implementations, the fingerprint is created by multi-spectral and/or hyperspectral imaging and advanced image processing techniques. In some implementations, for example, the multi-spectral and/or hyperspectral imaging is noninvasive in acquiring spectral data across many physical layers of the art piece (e.g., a range of depth from the surface of the artistic work) and in many domains (e.g., frequencies or wavelengths). The acquired multi-spectral and/or hyperspectral data is processed using the analytical algorithms to produce the fingerprint, which the raw and processed image data can be stored in a proprietary database. In some implementations, some of the data of a fingerprint may be encrypted for data security such that it can be distributed across a network of computers (e.g., the Internet), in a manner similar to blockchain. In some example embodiments, the multi-spectral imaging techniques do not require expensive data acquisition technology or equipment, and do not require a laboratory for data acquisition from the artistic work. Examples of the artistic work can include, but are not limited to, paintings, sculptures, drawings, photography, printed material, or other art work.

FIG. 1A shows a diagram of an example embodiment of a multi-modal art identification and/or authentication system 100 in accordance with the present technology. The system 100 includes a data acquisition platform 102 configured to acquire data from an artistic work 101 and/or obtain information pertaining to the artistic work 101. The system 100 includes a data processing device 104, in communication with the data acquisition platform 102, to process the acquired data of the artistic work 101 for analysis, storage, and/or display of the acquired data or obtained information. The system 100 includes one or more data storage devices 106, in communication with the data processing device 104, to store and maintain the acquired data or obtained information and analyzed data from the data processing device 104. The system 100 includes an output device 108, in communication with the data processing device 104, to delivery and/or present the acquired, analyzed and/or obtained data or information to a user operating the output device or to another device in communication with the device 108.

In some example embodiments of the system 100, the data acquisition platform 102 includes one or more data acquisition devices to acquire image data using one or multiple modalities, such as imaging (e.g., uni-spectral, multi-spectral and/or hyperspectral), chemical sampling (e.g., invasive and noninvasive), and/or monitoring (e.g., continuous or intermittent monitoring of various conditions such as temperature, humidity, light exposure, location, etc.). For example, in some implementations, images can be acquired using a robotic motion platform that precisely positions an imager, such as a camera, to detect light waves from select regions of the artistic work 101 in a coordinated movement. The imager can be configured as to acquire images from the infrared (IR) spectrum, visible light spectrum, ultraviolet (UV) spectrum, and/or X-ray spectrum. Chemical sampling can include noninvasive, non-destructive techniques, such as various Terahertz or X-ray spectroscopy. Monitoring data can be provided to the data processing device 104 by the monitoring device of the data acquisition platform 102 in real-time or post hoc. For example, the data acquisition platform 102 can include one or more imaging devices to obtain images in one or more spectra for image analysis; whereas, additionally or alternatively, the data acquisition platform 102 can include one or more chemical sampling devices to obtain a physical sample from the artistic work 101 for chemical analysis of the artistic work 101. In some implementations, for example, the data acquisition platform 102 can include other electromagnetic, optical and/or sound based sensing systems, including radar, laser, and ultrasound imaging systems.

In some implementations, the data acquisition platform 102 is configured to obtain information about the artistic work. For example, the data acquisition platform 102 can include one or more computing devices that perform and/or obtain research directly about or relevant to the artistic work 101, such as the artistic work's provenance, history (including ownership, handling, modifications, restorations, etc.), legal documentation, or other. For example, the data acquisition platform 102 can be configured to access 3rd party databases and resources and collect large amounts of information known related to the artistic work 101, such as information about other paintings and artists, e.g., which the system 100 can store and process to compare against in analysis of the artistic work 101.

In some example embodiments of the system 100, the data processing device 104 is embodied one or more computing devices such as a computer (e.g., server, desktop, or laptop) or smart device (e.g., smartphone, tablet, or wearable computing device) that includes a processor to process the data, a memory in communication with the processor to store data, and an input/output unit (I/O) to interface the processor and/or memory to other modules, units or devices of the system 100, and/or external devices. For example, the processor can include a central processing unit (CPU) or a microcontroller unit (MCU). For example, the memory can include and store processor-executable code, which when executed by the processor, configures the data processing device 104 to perform various operations, e.g., such as receiving information, commands, and/or data, processing information and data, and transmitting or providing information/data to another device. In some implementations, the data processing device 104 can include a computer system or communication network accessible via the Internet (referred to as 'the cloud') that includes one or more remote computational processing devices (e.g., servers in the cloud). In such implementations, the data processing device 104 can include a local computer that is in communication with the data acquisition device(s) 102 and include one or more cloud computers and computational devices that are communication with the local computer. In some implementations, the data processing device 104 includes computers configured in the cloud, in clusters, and/or in neural networks.

To support various functions of the data processing device 104, the memory can store information and data, such as instructions, software, values, images, and other data processed or referenced by the processor. For example, various types of Random Access Memory (RAM) devices, Read Only Memory (ROM) devices, Flash Memory devices, and other suitable storage media can be used to implement storage functions of the memory. The I/O of the data processing device 104 can interface the data processing device 104 with a wireless communications device and/or a wired communication device to utilize various types of wireless or wired interfaces compatible with typical data communication standards. The I/O of the data processing device 104 can also interface with other external interfaces, sources of data storage, and/or visual or audio display devices, etc. to retrieve and transfer data and information that can be processed by the processor, stored in the memory, or exhibited on the output device 108 or other external device. For example, a display unit of the output device 108 can be configured to be in data communication with the data processing device 104, e.g., via the I/O, to provide a visual display, an audio display, and/or other sensory display that produces a user interface of a software application ("app") in accordance with the art identification and/or authentication techniques of the disclosed technology. In some examples, the display unit can include various types of screen displays, speakers, or printing interfaces, e.g., including but not limited to, light emitting diode (LED), or liquid crystal display (LCD) monitor or screen, cathode ray tube (CRT), and/or hologram as a visual display; audio signal transducer apparatuses as an audio display; and/or toner, liquid inkjet, solid ink, dye sublimation, inkless (e.g., such as thermal or UV) printing apparatuses, etc.

In some example embodiments of the system 100, the data storage device(s) 106 includes one or more computing devices operating a database management system (DBMS) to maintain and control operations of various databases of the system 100. For example, the system 100 can include an identification database to store and organize all data acquired and obtained for a particular artistic work 101 assigned a unique identification based on the analyzed characteristics, analyzed by the data processing device 104, of the artistic work 101. The data storage device 106 can include a cultural database to store and organize research information, such as the artistic work's provenance, history, etc. The data storage device 106 can include an authentication database to store and organize information pertaining authentication events of the artistic work 101, discussed later in this disclosure. The data storage device 106 can include a transactions database to store and organize information and/or legal documents pertaining to financial transactions or offers associated with the artistic work 101. These example databases can be included as a singular database or as individual databases. In some implementations, 3rd party databases can be used to store and organize information pertaining to the artistic work 101, e.g., such as the cultural database or blockchain registries.

In some example embodiments of the system 100, the output device 108 includes a personal computer such as a desktop or laptop computer, a mobile computing device such as a smartphone, tablet, smartwatch, etc., or other computing device to display data from the data processing device 104, the data acquisition platform 102, and/or the data storage device 106. In some implementations, the output device 108 includes a software application ("app") that is stored on the output device 108 and controls various functionalities associated with the system 100 such as processing, storing and displaying data received from the data processing device 104.

Figure 1B:
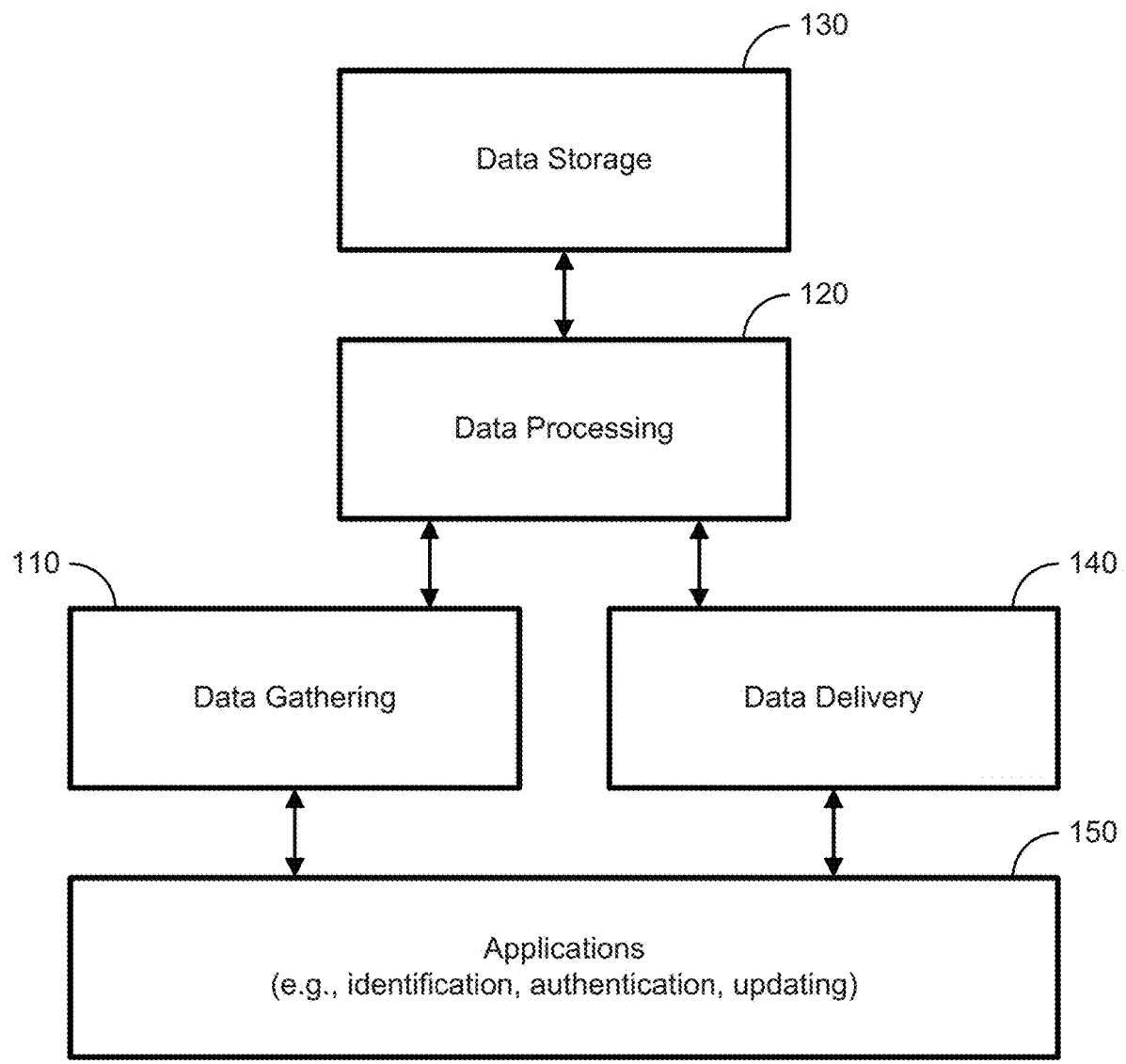
FIG. 1B shows a functional block diagram depicting operations of the example system shown in FIG. 1A.

FIG. 1B shows a functional block diagram depicting operations of the system 100. As shown in the diagram, the system 100 is configured to gather data and information, at 110; to process the data and information, at 120; to store and organize the processed data and information, at 130; and to deliver output data generated from the processed data and information, at 140. The system 100 can perform certain operations among the data gathering operations 110, the data processing operations 120, the data storage operations 130 and the data delivery operations 140 based on a particular application or applications, at 150, such as creating an identification of the artistic work 101, authenticating the artistic work 101, diagnosing and/or monitoring the artistic work 101, and/or grouping or discovering relational features from the artistic work 101 with other similar objects.

The system 100, e.g., implementing the example devices of the data acquisition platform 102, can gather data including acquiring image data, procuring chemical samples for chemical analysis, monitoring conditions of the artistic work 101, and/or obtaining data directly about or indirectly relevant to the artistic work 101. The data processing device 104 can perform data processing operations 120 on the gathered data, including but not limited to the following. The data processing device 104 can generate a unique identification (e.g., a digital fingerprint) that solely corresponds to the artistic work 101 based on the physical characteristics of the artistic work determined from the analysis of the gathered data and information. The data processing device 104 can authenticate the artistic work 101 based on a multi-stage technique that validates the unique identification of the artistic work with analyzed characteristics from a current data acquisition session of the artistic work 101. Such authentication implementations can determine authenticity of the artistic work, inauthenticity of the artistic work, or an incomplete authentication session. The data processing device 104 can further authenticate the artistic work 101 for subsequent diagnostic and monitoring purposes (e.g., for a scientific condition report/clinical chart), which can be used to assign and/or update an assigned 'value' to the artistic work 101, such as a material degradation, no contemporary modifications to the work, or outright damage. The data processing device 104 can further analyze the artistic work 101 with data associated with other artistic works or objects to create groupings of the artistic work 101. Due to the many attributes of each individual pixel acquired through the imaging techniques, for example, the system 100 can perform machine-learning to determine such groupings. By querying the archive of previously studied works and the data associated with those studies, they can be compared to the data associated with artistic work 101 to validate or invalidate consistencies.

The system 100, e.g., implementing the example data processing device 104, can receive and process gathered data, in which the received data and the processed data can be stored by the data storage device 106. The data storage device 106 can perform data storing and organizing operations 130 on data, including but not limited to the following. The data storage device 106 can store and retrieve data in the authentication database, including the digital fingerprint for the analyzed artistic work 101, raw images or pre-preprocessed obtained data acquired by the data acquisition platform 102, processed data (e.g., images or chemical samples) with metadata associated with the data acquisition and/or processing, proprietary metadata (e.g., topography, color, age, state of health/conservation/degradation, pigment specifics, etc.), images and monitoring data acquired over time (e.g., continuous or time slices with changes), and references and information to known fakes and similar items. Similarly, the data storage device 106 can store and retrieve data in the cultural database, such as provenance information, historical information, artist information, context, images and the like, each of which can include metadata; the data storage device 106 can store and retrieve data in the authentication database via the digital identification, such as an authentication record of past authentication sessions performed on the artistic work 101 and analytical data associated with such authentication sessions; and the data storage device 106 can store and retrieve data in the transactions database.

In some implementations, the system 100 is operable to produce an identified work data structure that includes a log of activities of the artistic work 101, a log of inquiries about the artistic work 101, and/or a log of transactions (e.g., financial transactions including loans, change of ownership, insurance) of the artistic work. The data structure can include a chain of events recorded in plain language text and/or images associated with the transactions, activities or inquires, in which the chain of information is represented in the data structure as code. In some embodiments, the data structure is encrypted.

The system 100, e.g., implementing the example output device 108, can receive, transfer, and/or present data to perform data delivery operations 140. Examples of displayable data by the output device 108 include multi-level image data display, which can show multiple layers of analyzed data from the artistic work 101 and/or multiple spectral levels analyzed from an image or sample of the artistic work 101. Examples of displayable data include confirmation or denial of validation from an authentication session, that is whether or not the artistic work 101 is authenticated based on the digital identification. Examples of displayable data include condition reports, e.g., which can provide information about changes made to the artistic work over time. Examples of displayable data include a digital audit trail, e.g., including provenance, transactional history (e.g., sale, insurance, claims, changes/restorations), or block chain information. Examples of displayable data include alerts, e.g., including potential fraud alerts, such as someone trying to obtain the digital identification for an object in the user's possession. Also, for example, the displayable data can include condition alerts, such as an environmental condition change that would affect the artistic work, e.g., including an increase or decrease in humidity and/or an increase or decrease in temperature, and/or an unexpected light illumination instance upon the artistic work, or an increase or decrease from the desired light illumination on the artistic work. Other examples of alerts include a 'similar for sale' alert, or a 'buyer interested' alert. Examples of displayable data include information about the artistic work 101, such as the context information, the authentication information, and information about comparable works (e.g., such as pricing, history and location of a comparable work of art). In some examples, alerts originating from the system can be sent to the owner of the ID, e.g., such as a fraud alert, or as an inquiry alert based on inquiries associated. For example, statistic information about inquiries of similar works (e.g., artist, period value) may be used to characterize market volatility.

Figure 1C:
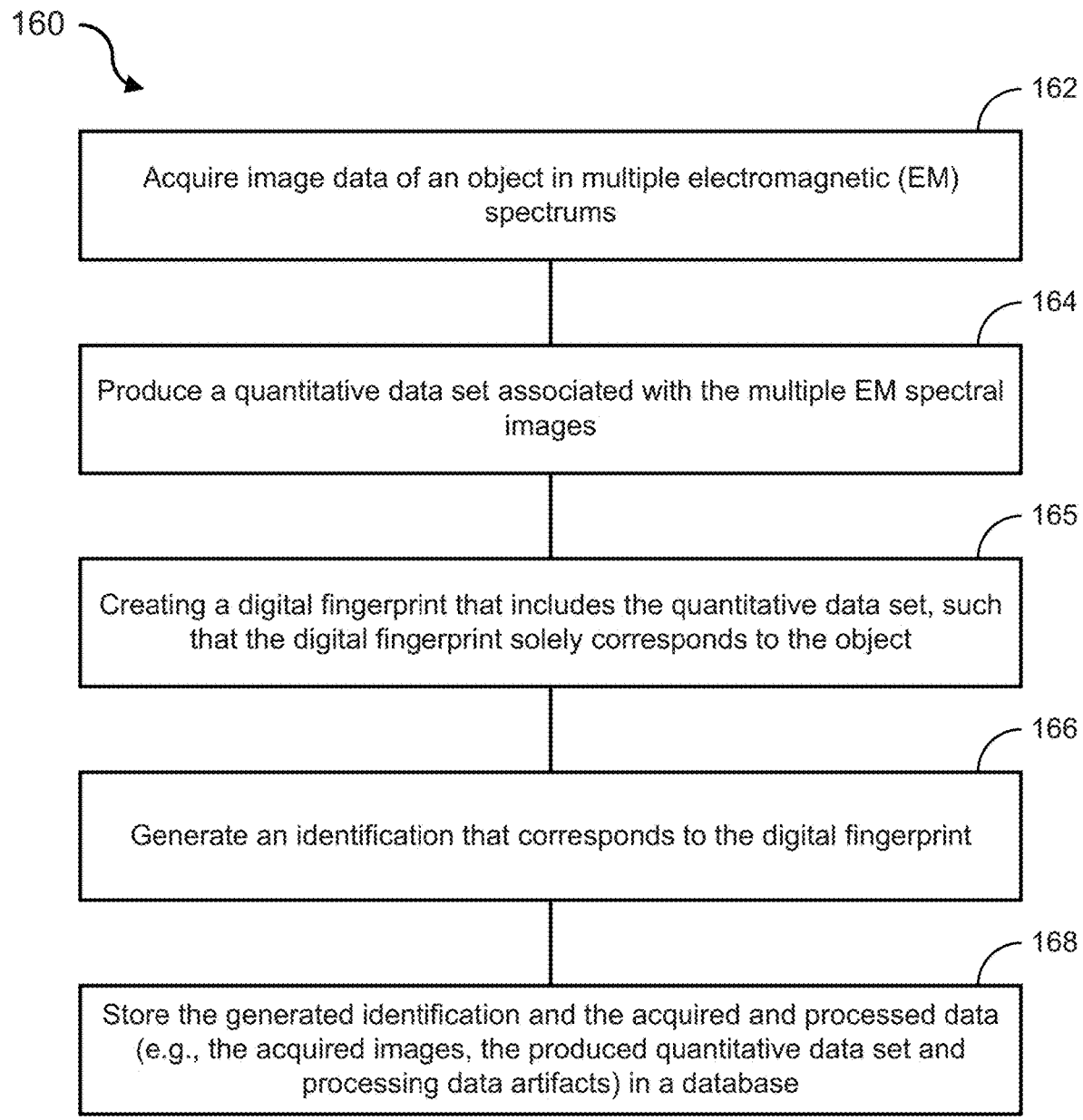
FIG. 1C shows a diagram of an example embodiment of a method for generating a unique identification that solely corresponds to an object.

FIG. 1C shows a diagram of an example method 160 to generate a unique identification (e.g., the digital fingerprint) that solely corresponds to an object (e.g., artistic work 101) based on data gathering operations 110 and data processing operations 120 in compilation with data storage operations 130. The method 160 includes a process 162 to acquire image data of an object in multiple electromagnetic (EM) spectrums, e.g., using multi-spectral imaging and/or hyperspectral imaging. The method 160 includes a process 164 to produce a quantitative data set associated with the multiple EM spectral images. The method 160 includes a process 165 to create a digital fingerprint that includes the quantitative data set, in which the digital fingerprint solely corresponds to the object. For example, implementations of the processes 164 and 165 can produce a fingerprint comprising data that can only be linked to the object, and none other, based on the unique physical characteristics of the object manifested in the quantitative data. The method 160 includes a process 166 to generate an identification that corresponds to the digital fingerprint (e.g., unique multiple EM spectral quantitative data set of the fingerprint), where the identification only references the object. The method 160 includes a process 168 to store the generated identification and the acquired data (e.g., the acquired image data and metadata) and processed data (e.g., the produced quantitative data set, metadata, and data artifacts recorded by a user or from the processed image data) in a database. For example, the data artifacts can include scientific points of interest associated with distinguishing features of the object, which can be included in the stored data by user input of the data artifact or by automated detection of a distinguishing feature of the object from the quantitative data set. In an example, for a painting, a data artifact could include craquelure (i.e., an age-related/drying feature common in oil painting that appears as cracking on the surface), an under-drawing (i.e., a preparatory drawing often in graphite or charcoal), a non-contemporaneous restoration (e.g., often seen as paint loss that has been covered up) or pentimenti (i.e., alterations made by the artist as they create the work)

In some implementations, the process 162 can include acquiring the image data by capturing multi-spectral images for at least two points or regions of the object, where each multi-spectral image associated with a point or region is captured within a particular frequency band of an EM spectral group for two or more EM spectral groups. In some implementations, the process 162 can include acquiring the image data by capturing hyperspectral images for at least two points or regions of the object, where each hyperspectral image associated with a point or region is captured within one or more narrow frequency bands within an EM spectral group or groups. In some implementations, the process 162 can include acquiring the image data by capturing multi-spectral and hyperspectral images of the object.

The quantitative data set produced in the process 164 represents physical characteristics of the object determined from the analysis of the acquired images. In some implementations, for example, the processes 164 and 166 can include the data processing device 104 creating a pixel by pixel dataset/point cloud (set of data points in space) of each layer imaged by the data acquisition platform 102, e.g., after the imaging is completed or concurrently with the imaging. For example, each pixel, in each layer, can contain more than five unique attributes. The combinations created by so many unique pixels across multiple layers can be in the billions, for example. Based on the large quantity of attributes in each pixel, layer and overall data set from the image data of the artistic work, the data processing device 104 can encode and decode these unique pixel attributes to secure the information that is undiscoverable by a third party. This data is encrypted so that only the data processing device 104 and computing devices authorized by the data processing device 104 can decode it. In some implementations, the processes 164 and 166 include producing an encryption algorithm to unscramble all potential incorrect combinations to the one and only true original authenticated combination (e.g., the generated identification, i.e., digital fingerprint) unique to that specific artistic work.

In an example, the encryption algorithm can include backwardation of a Gaussian diffusion of the data, in which the algorithm determines the possible paths of the data and identifies a positive identification. For example, the system 100 can statistically reconcile the slight variability in acquired image data in implementations of the encryption algorithm. As an example, when data points acquired are expected to be identical but are not, if the variance falls in the normal distribution of the variance of any given data point acquired, the encryption algorithm can use a mathematical Gaussian diffusion function, in which the algorithm determines the possible paths of all combinations of data, and will respect variances between data points as long as the cumulative result still falls into the normal distribution, and therefore identifies a positive identification with statistical surety.

Figure 1D:
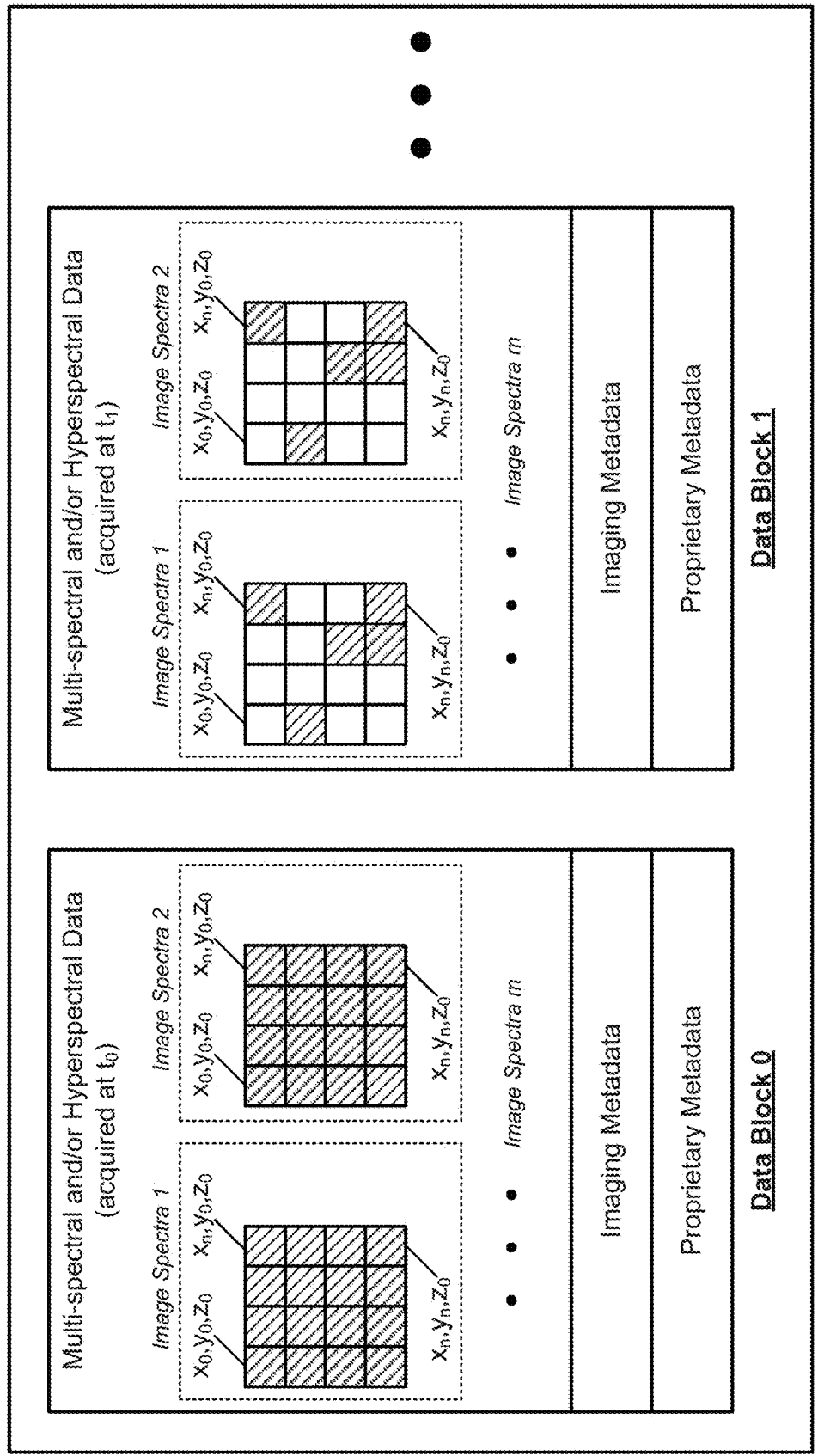
FIG. 1D shows a diagram of an example embodiment of a digital fingerprint associated with an object in accordance with the present technology.

FIG. 1D shows a diagram of an example embodiment of a digital fingerprint associated with an object in accordance with the present technology, labeled as fingerprint 1000. The digital fingerprint 1000 includes one or more data blocks that contain an organized set of data for a particular object (e.g., artistic work). In the example shown in FIG. 1D, the digital fingerprint 1000 includes two data blocks (i.e., data block 0 and data block 1), but may include any number of data blocks. The digital fingerprint 1000 includes at least one data block, i.e., data block 0.

Each data block of the digital fingerprint 1000 is associated with a multi-spectral and/or hyperspectral imaging event of the object at a point in time, e.g., the processed multi-spectral imaging data, hyperspectral imaging data, or any combination of both, in accordance with the process 162. The multi-spectral and/or hyperspectral data in the digital fingerprint can include digital processed image data or the acquired (raw) imaging data associated with the particular locations (coordinates) of the object that are imaged by multi-spectral and/or hyperspectral imaging. Each data block of the digital fingerprint 1000 can include metadata, e.g., (i) imaging metadata such as a date/time of imaging, imaging settings, etc. and/or (ii) proprietary metadata such as information about the object like author/artist name, country of origin, provenance info, topography info, object materials and attributes info (such as colors of paint, type of paint, etc.), age, pigment specifics, past and present state of health/conservation/degradation, etc. In some embodiments of the digital fingerprint 1000, a data block can be included that is not associated with a multi-spectral and/or hyperspectral imaging session, e.g., such as a data block that may just include information about the object, such as a recent change in its condition.

As shown in the diagram of FIG. 1D, the data block 0 includes multi-spectral and/or hyperspectral image data associated with a first imaging session at a first time to, e.g., in accordance with the method 160. The multi-spectral and/or hyperspectral image data includes images associated with selected spectral bands at particular coordinates of the object (x,y,z). In the example diagram, the multi-spectral and/or hyperspectral image data includes a data set for all coordinates of the object (e.g., $x_0,y_0,z_0$ to $x_n,y_n,z_n$) for image spectra 1, image spectra 2, . . . image spectra m. For example, the image spectra data set for image spectra 1 may correspond to the set of processed image data for each coordinate of the object, where each image is acquired in a particular EM spectral band in accordance with a multi-spectral imaging protocol; or the image spectra data set for image spectra 1 may correspond to the set of processed image data for each coordinate of the object, where each image is acquired in a narrow frequency band of a particular EM spectral band in accordance with a hyperspectral imaging protocol. Notably, while the example of FIG. 1D shows the image data set for all coordinates of the object, in some implementations the data block 0 is not required to have multi-spectral and/or hyperspectral image data for every coordinate.

The example shown in FIG. 1D depicts the digital fingerprint 1000 including the data block 0 and a data block 1. The data block 1, in this example, includes multi-spectral and/or hyperspectral image data associated with a second imaging session, which occurs at a second (later) time $t_1$ than the first time $t_0$. The multi-spectral and/or hyperspectral data of data block 1 includes the processed image data associated with selected spectral bands at particular coordinates of the object (x,y,z), which in this example, is a smaller subset than the number of coordinates in data block 0. Also, in the example, the image spectra data set of data block 0 includes the multi-spectral and/or hyperspectral image data for the same spectra 1, spectra 2 . . . etc. as in the data block 0. Yet, the data blocks of the digital fingerprint 1000 can have image data sets that may vary in image spectra selected and/or object coordinates imaged with respect to other data blocks in the data block chain.

In the examples discussed above, the multi-spectral and/or hyperspectral data include the processed multi-spectral and/or hyperspectral data, which includes a quantitative data set representing the specific physical characteristics of the object at the point or region of the object that was imaged by the multi-spectral and/or hyperspectral imaging technique. Typically, the raw imaging data is stored in the one or more data storage devices 106 and managed by the database management system (DBMS), and the processed imaging data is recorded (which can be encrypted) in the fingerprint 1000, in which the fingerprint 1000 can be stored the one or more data storage devices 106). Whereas, in some embodiments of the digital fingerprint 1000, the raw imaging data may also be included in the fingerprint 1000.

The fingerprint 1000 (e.g., the data block chain) is stored in a proprietary database. In some implementations, some or all of the data in the data blocks of the fingerprint 1000 may be also stored in encrypted form on the data block chain, in which the limited and encrypted version of the fingerprint can be disseminated across a network of computers (e.g., the Internet). For example, peer-to-peer data sharing requires the use of web services to communicate, and thus the proprietary data of the fingerprint is never fully transmitted to the client node, but instructions and/or results associated with the digital identification of an object may be permitted to transfer in such manner.

Implementations of the method 160 can include one or more of the following features. In some implementations, for example, the process 162 can include acquiring chemical data from the object using pseudo-invasive or noninvasive chemical sampling techniques. For example, a noninvasive chemical sampling technique includes Terahertz or X-ray spectroscopy; and a pseudo-invasive chemical sampling technique includes SEM-EDS analysis of cross-section samples (e.g., biopsies of the art work) or Raman Spectroscopy.

Figure 1E:
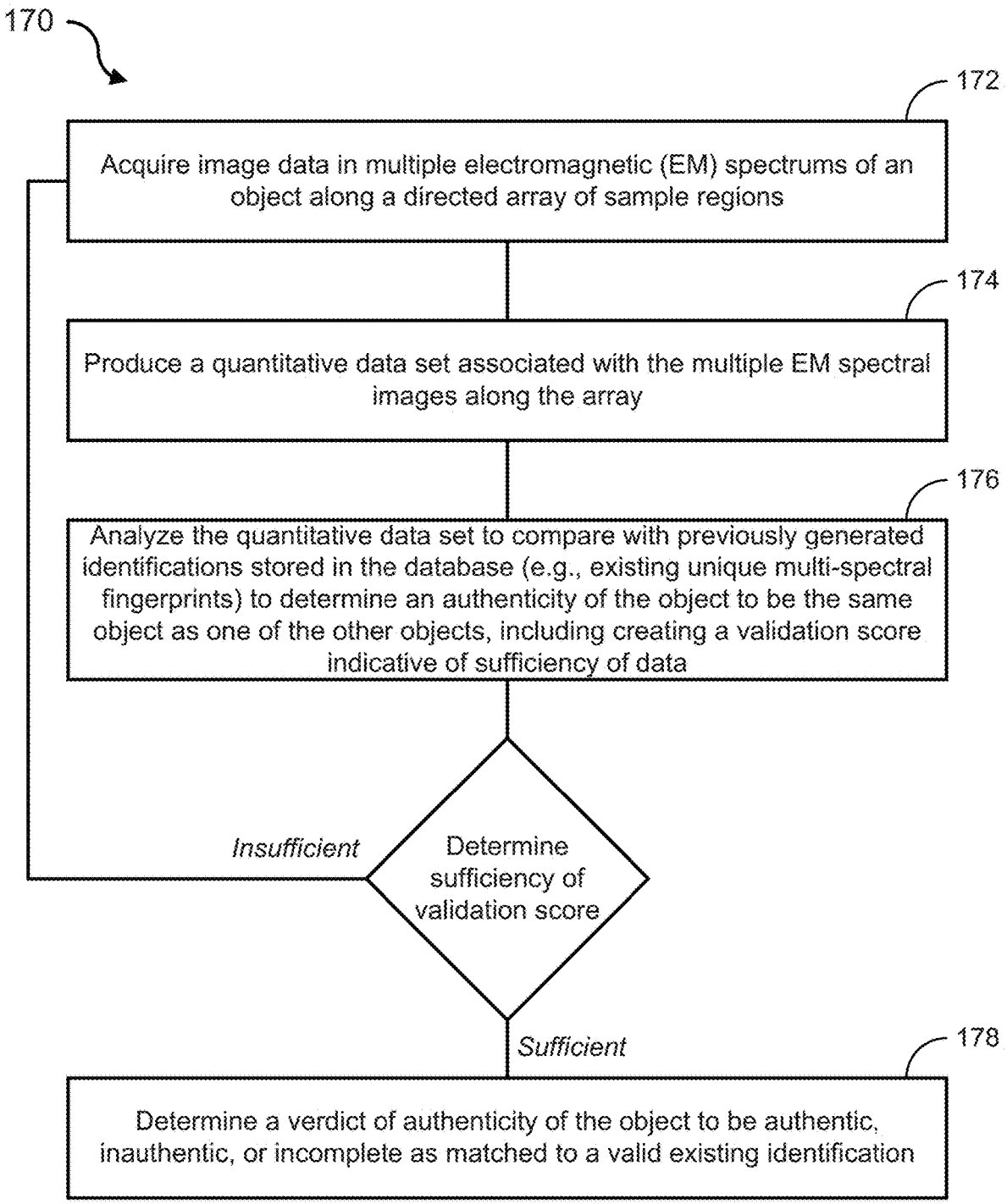
FIG. 1E shows a diagram of an example embodiment of a method authenticating an object based on existing unique identifications.

FIG. 1E shows a diagram of an example method 170 to authenticate an object using the existing unique identification assigned to the authentic object (e.g., artistic work 101), from the method 160, based on data gathering operations 110 and data processing operations 120 in compilation with data storage operations 130. The method 170 includes a process 172 to acquire image data in multiple electromagnetic (EM) spectrums along a directed array of sample regions of the object. The method 170 includes a process 174 to produce a quantitative data set associated with the multi-EM spectral images along the array. For example, the produced quantitative data set can include a pixel by pixel data set across a portion or all of the imaged layers, e.g., containing unique attributes about each individual pixel across multiple layers of the object. For example, implementations of the processes 172 and 174 can include producing a subsequent data block in the digital fingerprint 1000, e.g., such as the example data block 1, where only a portion of the object was imaged and its imaging data processed to produce the quantitative data set associated with the multi-spectral and/or hyperspectral images. The method 170 includes a process 176 to analyze the quantitative data set produced for the imaged object to compare with previously generated quantitative data sets (e.g., fingerprints of other objects, which have their respective identifications), which are stored in the database (i.e., storing existing unique multi-EM spectral fingerprints) to determine an authenticity of the object to be the same object as one of the other objects. In some implementations, the process 176 includes creating a validation score indicative of sufficiency of data to the object. When the validation score is sufficient, i.e., indicating sufficient data to make a comparison between the quantitative data set and the data associated with existing multi-EM spectral fingerprints, the method 170 includes a process 178 to determine a verdict of authenticity of the object to be authentic, inauthentic, or incomplete as matched to a valid, existing identification. When the validation score is insufficient, i.e., indicating there is not enough data (or there are too many discrepancies) to make a comparison between the quantitative data set and the data associated with existing multi-EM spectral fingerprints, the method 170 may include repeating the process 172 to obtain the image data along the directional array and/or obtain additional data, e.g., a different directional array of the object.

Further example embodiments and implementations of the system 100 are described below for multi-spectral and/or hyperspectral imaging and analysis to quantitatively identify and authenticate a physical object, such as an artistic work.

Figure 2A:
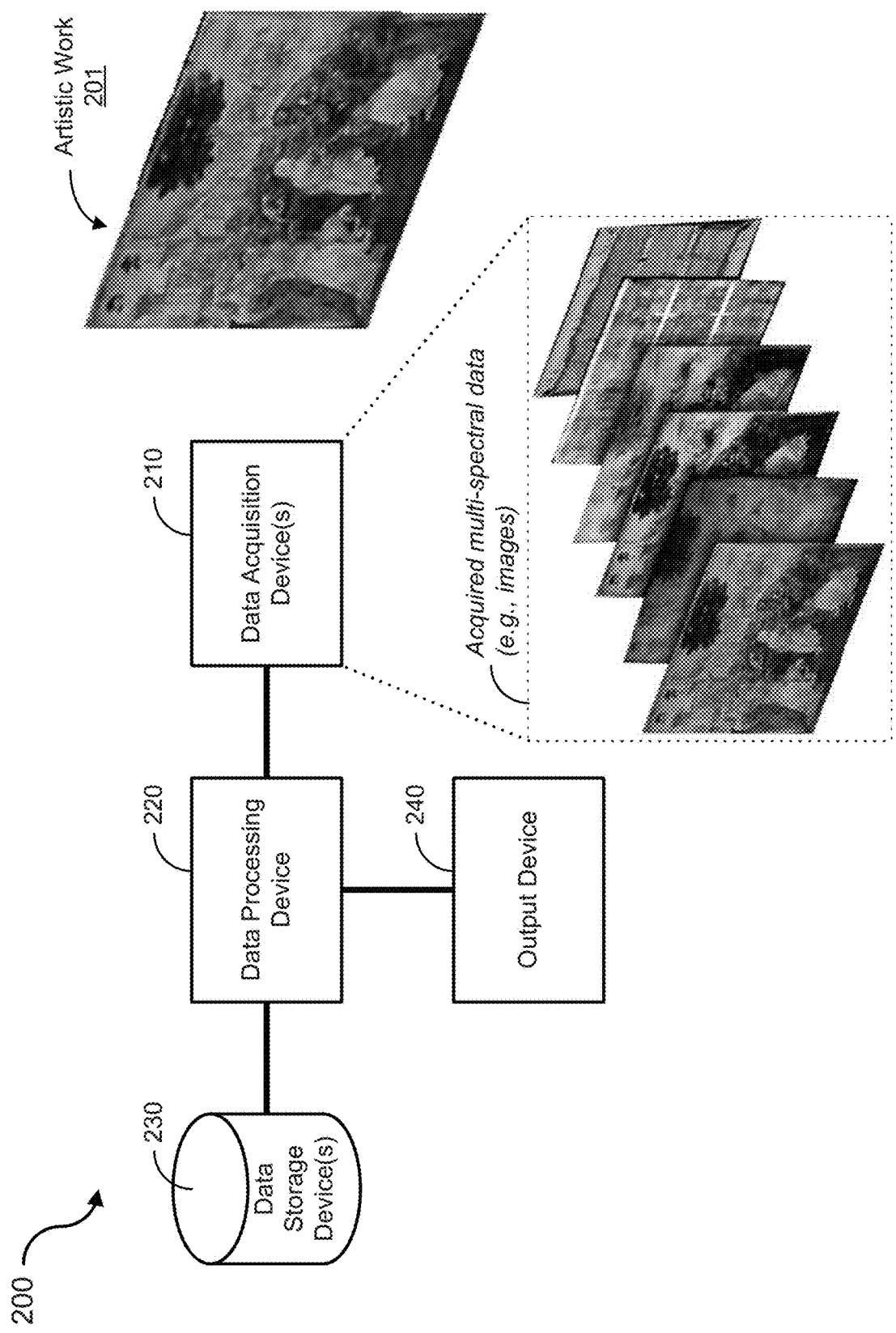
FIG. 2A shows a diagram of an example embodiment of an art identification and authentication imaging system in accordance with the present technology.

FIG. 2A shows a diagram of an example embodiment of an art identification and authentication multi-spectral and/or hyperspectral imaging system 200 in accordance with the present technology. The system 200 includes a multi-spectral imaging platform 210 configured to acquire image data in multiple light spectrums of an artistic work 201 along a coordinated array of sample regions of the artistic work 201. In some implementations, for example, the multi-spectral imaging platform 210 can acquire image data in one or more of the infrared (IR) spectrum, visible light spectrum, ultraviolet (UV) spectrum, and/or X-ray spectrum. In some embodiments, the multi-spectral imaging platform 210 includes a robotic motion positioning system coupled to one or more imagers to precisely coordinate movement and position the imager(s) to detect light waves from select regions of the artistic work 201 and capture such images in one or more spectra, e.g., IR, visible light, UV, and/or X-ray. In example implementations of data acquisition in the IR spectrum, the multi-spectral imaging platform 210 can record one or more of the following: IR image data using IR reflectography (IRR) and/or IR photography (IRP) imaging techniques; UV image data using UV fluorescence imaging techniques; visible light image data using photomicrography imaging techniques; and/or X-ray image data using X-ray imaging techniques. In each data acquisition, for example, the multi-spectral imaging platform 210 can obtain metadata associated with each scan, e.g., including but not limited to date, time, location, temperature, humidity, and other data associated with the data acquisition process and environment of the artistic work being scanned.

Figure 2B:
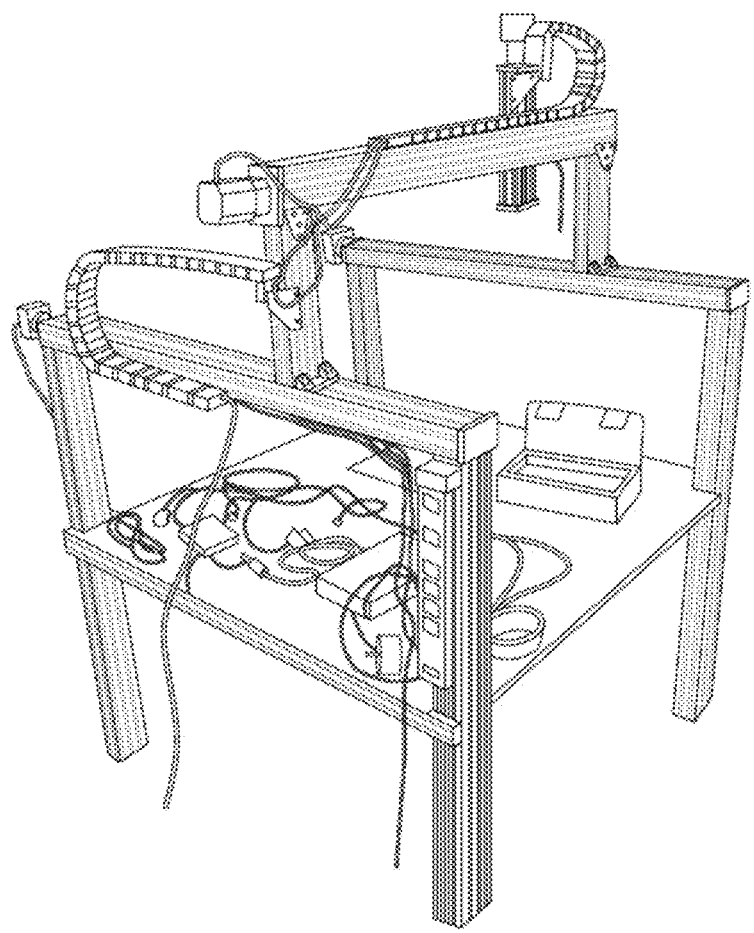
FIG. 2B shows an image of an example embodiment of a multi-spectral imaging platform in accordance with the present technology.

FIG. 2B shows an image of an example embodiment of the multi-spectral imaging platform 210. For example, the example imaging platform shown in FIG. 2B includes imaging sensors designed to collect data on the subject art work while recording the data in precise geometry (x,y,z) coordinates of every data point. Example imaging sensors can include one or more cameras that can capture multi-spectral images, hyperspectral images, or a combination thereof. In some examples, the one or more cameras can include an SLR camera with filter lenses that filter out the undesired light wavelengths such that only the desired EM spectral frequency range or ranges of light are captured by the camera. In some examples, the image sensors to obtain multi-spectral and/or hyperspectral data can include any of: a Nikon D810 or D7000 (e.g., with or without internal IR filter removed), Nikon D7000 (e.g., with or without internal IR filter removed), Phase One IQ4, Machine Vision Camera (e.g., Keyence—XG-X Series), 2D/3D Laser Scanner (e.g., LJ-V7000), SWIR Camera (e.g., Widy SWIR 320, or Xenics Bobcat-640-CL, or Xenics Tigris-640), or Hyperspectral xiSpec MQ022HG-IM-LS150-VISNIR or Secim SPECIM FX10. The image sensors (imager(s)) are attached to a robotic motion positioning system, secured to a surface (e.g., table) on which the artistic work 201 sits, to precisely coordinate movement and position the imager(s) to detect the select EM waves from select regions of the artistic work 201. Control software directs the data collection including precise lighting, light bandwidth (through lens filter combinations) as well as exposure parameters (aperture, duration, focus) for every image. For example, in some implementations, the multi-spectral imaging platform 210 includes a lighting bracket that travels with the camera to ensure the same lighting conditions for each image acquired in the array of sample regions.

Figure 2C:
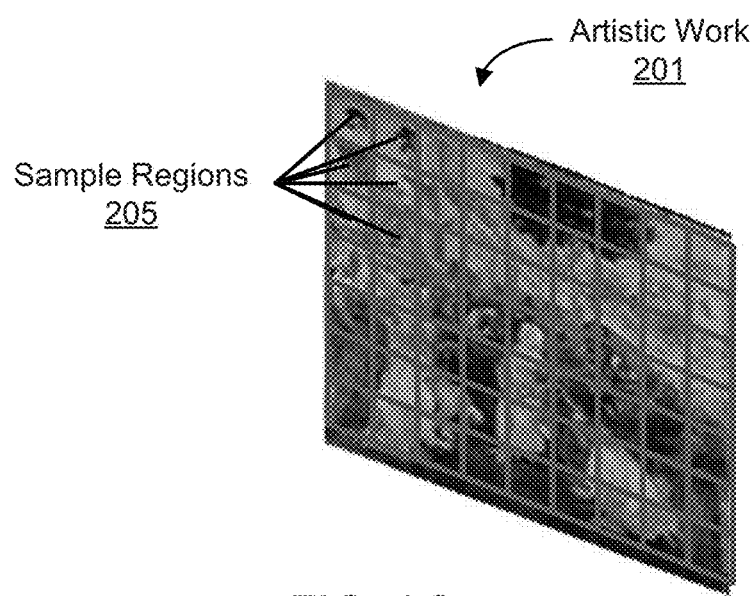
FIG. 2C shows a diagram depicting an example array of sample regions of an artistic work from which multi-spectral image data is acquired and analyzed by the art identification and authentication system in accordance with the present technology.

FIG. 2C shows a diagram depicting an example array of sample regions 205 of the artistic work 201 of which the multi-spectral imaging platform 210 obtains the multi-spectral image data from each sample region of the array 205. In some implementations, the array of sample regions 205 is configured over a select portion of the artistic work 201, e.g., such as some or all of a surface of the artistic work 201. In instances of a painting like that shown in FIG. 2C, for example, the array of sample regions 205 includes a contiguous array of sample regions across the painted surface of the painting, and through various depths beneath the surface of the painting (which can be defined as layers). As such, the array of sample regions 205 can have x, y, z coordinates defining an area and a volume of a sample of the array 205. In some implementations, the sample regions of the array 205 are contiguous across one dimension, two dimensions, or three dimensions of one or more surfaces of the artistic work 201; whereas in other implementations, the sample regions of the array 205 are discontiguous in at least some portions of the artistic work 201. In implementations of an image acquisition process, the array of sample regions 205 is configured to include a frame of reference point or points associated with certain location(s) on the artist work 201 for defining relative distances between the sample regions of the array 205.

Referring to FIG. 2A, the system 200 includes a data processing device 220 configured to process the multi-spectral image data of the artistic work 201 acquired by the multi-spectral imaging platform 210. Example embodiments of the data processing device 220 can include those of the data processing device 120. The data processing device 220 is configured to process the multi-spectral image data for the sample regions of the array 205 to produce a quantitative data set associated with each sample region. The data processing device 220 is operable to produce an identification, e.g., the fingerprint 1000, of the artistic work 201 and the data processing device 220 is operable to authenticate the artistic work 201, in which either or both operations can be performed in an implementation of the system 200. In some implementations, for example, the system 200 is configured to identify an artistic work and/or authenticate the artistic work by implementing the method 160 and/or the method 170 as shown in FIGS. 1C and 1E, respectively.

The system 200 includes a database 230 in communication with the data processing device 220. The database 230 is configured to store acquired multi-spectral and/or hyper-spectral image data of objects (e.g., the artistic works) and identification data (e.g., fingerprints) of each respective artistic work, e.g., including multiple instances of the data over time. In some implementations, the database 230 can store additional quantitative data about the artistic works, e.g., including quantitative information such as monitoring data associated with the 'health' of the artistic work over time (e.g., temperature obtained from a temperature sensor, light exposure obtained from an optical sensor, humidity obtained from a moisture sensor, etc.); previous authentication checks; or other. In some implementations, the database 230 can store additional qualitative data about the artistic works, e.g., including attribution data about the art work and its artist, provenance data such as information about the origin, prior owners, handling, etc. of the artistic work, and/or history data such as catalogue data (e.g., prior non-quantitative assessments or authentications, such as those performed by an art expert).

For example, the database 230 can include one or more sub-databases assigned to certain types of data to be stored and organized for the system 200. For example, the database 230 can include the identification database to store and organize all data acquired and obtained for the artistic work 201 based on implementations of the method 160. For example, the database 230 can include the authentication database to store and organize information pertaining authentication events of the artistic work 201 based on implementations of the method 170. In some embodiments, for example, the database 230 can include a cultural database or be in communication with a third party cultural database, which stores information of artistic works associated with provenance, history, etc. In implementations of the database 230 including the cultural database, the information can be stored according to the art work's generated identification. In some embodiments, for example, the database 230 an include the transactions database to store and organize information associated with financial transactions or legal matters for the artistic work 201.

The system 200 includes an output device 240, in communication with the data processing device 104, to delivery and/or present the acquired, analyzed and/or obtained data or information to a user operating the output device or to another device in communication with the device 108. Examples of the output device 240 include a computing device with a display, including but not limited to a desktop or laptop computer, a smartphone, a tablet, or a wearable computing device like a smartwatch or smartglasses.

Figure 2D:
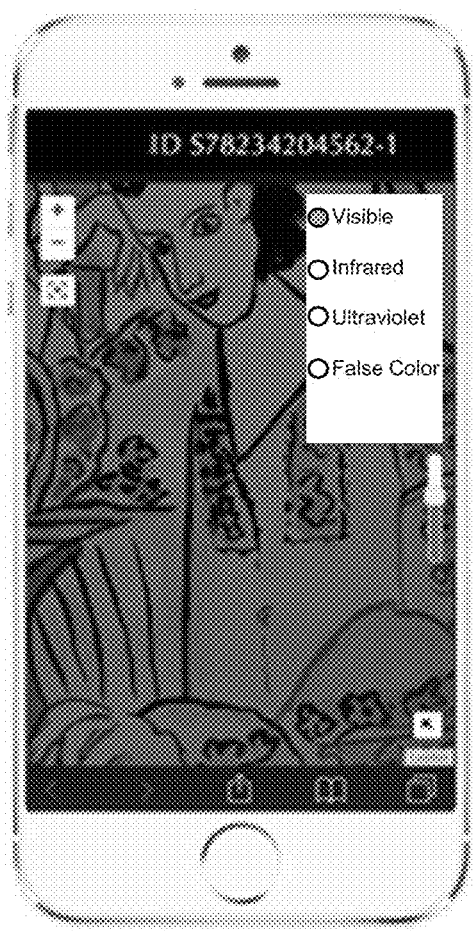
FIG. 2D shows an illustrative diagram of an example smartphone device displaying a user interface of a software application in accordance with the present technology.

FIG. 2D shows an illustrative diagram of an example smartphone device displaying a user interface of a software application (app) of the disclosed system 100 or 200. In this example, the smartphone device embodies the output device 240 (or output device 108). In some implementations, for example, the example smartphone device can also embody at least some of the processing modules of the data processing device 220 (or data processing device 104). As shown in the diagram, the app displays a user interface that can feature the fingerprint ("ID") associated with an analyzed artistic work, and an image depicting the artistic work specifically associated with the fingerprint ID. In this example, the app can also display a user input box that allows the user to display other images associated with the acquired multi-spectral and/or hyperspectral data. In the example, the visible light image data is displayed on the app's user interface. In some implementations, the app can also include zoom functionality and focusing features to view the image data at certain locations with high resolution. In some implementations, the app provides data entry functionality to add notes or other data to the fingerprint associated with the particular artistic work, e.g., add a new data block in the chain of data blocks.

Figure 3:
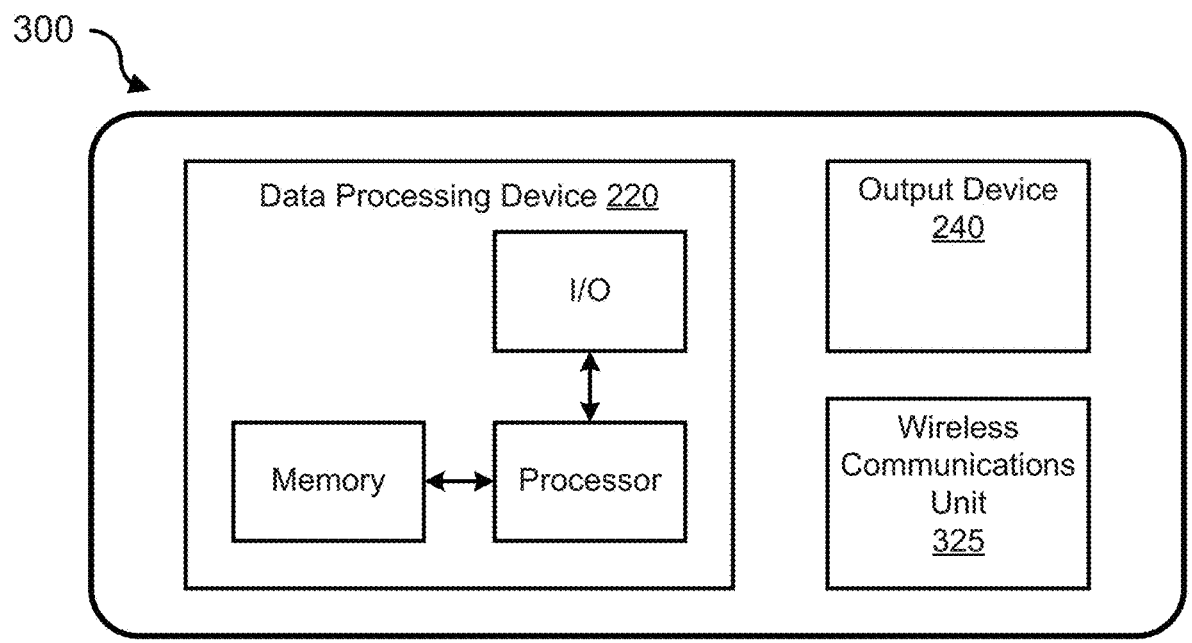
FIG. 3 shows a diagram of an example embodiment of a device for implementing art identification and/or authentication techniques in accordance with the present technology.

FIG. 3 shows a diagram of an example embodiment of a device 300 that embodies at least some of the devices of the system 100 and 200 as shown in FIG. 1A and FIG. 2A, respectively, such as the data processing device 104 or 220. The device 300 is operable to implement art identification and/or authentication techniques in accordance with the present technology, such as the example methods 160 and 170 described in FIGS. 1C and 1B, respectively. In the example embodiment of the device 300 shown in FIG. 3, the device 300 also includes the output device 108 or 240. The device 300 can be embodied as a smartphone, tablet or wearable computing device, a computer, or other computing device including a display screen. In some implementations of the device 300, such as a smartphone, tablet, etc., the device 300 includes a wireless communications unit 325 to receive data from and/or transmit data to another device. In some implementations, for example, the wireless communications unit 325 includes a wireless transmitter/receiver (Tx/Rx) unit operable to transmit and/or receive data with another device via a wireless communication method, e.g., including, but not limited to, Bluetooth, Bluetooth low energy, Zigbee, IEEE 802.11, Wireless Local Area Network (WLAN), Wireless Personal Area Network (WPAN), Wireless Wide Area Network (WWAN), WiMAX, IEEE 802.16 (Worldwide Interoperability for Microwave Access (WiMAX)), 3G/4G/5G/LTE cellular communication methods, and NFC (Near Field Communication).

In some implementations, the system 100 can include an apparatus set-up in a controlled lab setting and configured specifically for the purpose of imaging and/or authenticating an artistic work (e.g., painting) under controlled conditions, including controlled lighting, using specialized data acquisition and/or analysis equipment (e.g., such as specialized imaging/camera technologies, chemo-analysis technologies, etc.). An example can include the multi-spectral imaging platform 210, shown in FIG. 2B, in communication with a computer workstation and a database, e.g., in the cloud.

In some implementations, the system 100 can include a portable apparatus moveable to an implementation site, e.g., a 'mobile lab', which can include the same or similar capabilities of the example controlled lab setting with respects to some aspects in lighting and imaging, and with the additional capability that it can be delivered anywhere in the world to identify and/or authenticate the artistic work while providing the closest approximation to the full lab.

In some implementations, the system 100 can include one or more peripheral devices that can be attached to smart device technology (e.g., such as a smartphone or tablet) and used to capture a subset of data that can be used to verify the identity of the work of art, but, the peripheral device(s) may not be able to be used to collect all initial data necessary to create the ID. In such implementations, the system 100 can include the device 300 embodied on a smartphone or tablet, where the data acquisition platform 102 includes the camera of the smartphone or tablet coupled with the peripheral device to provide the capability of acquiring the multi-spectral and/or hyperspectral images in multiple spectra of light from the target object (e.g., artistic work).

In some implementations, the system 100 can include a fully integrated hyperspectral or multi-spectral camera or cameras and/or components on a mobile computing device capable of analyzing and determining the identity of a work of art. In such implementations, the system 100 can include the device 300 embodied on a smartphone or tablet. In such implementations, the fully-integrated hyperspectral or multi-spectral camera(s) may not be able to be used to collect all initial data necessary to create the ID.

Example Use Cases

The following are example uses cases that the disclosed systems and methods are envisioned to provide benefit and overcome significant technical problems not yet overcome by conventional techniques.

Example Use Case 1—Stolen Art Identification—The disclosed systems and methods can be used to identify art that was stolen during time of war (e.g., WWII Nazi stolen works being the most infamous) or by organized crime or by thieves, and subsequently sold in the black/secondary market. For example, when a work is questionable that it may have been stolen, the works can be compared using the disclosed systems and methods with previous high-resolution images of said work of art. While identification of this work would likely be lower in statistical accuracy, the multi-EM spectral data produced by implementations of the disclosed systems and methods could be used to determine that the work is the same as previously imaged.

Example Use Case 2—Auction House Resale—Each time an auction house wishes to sell a work of art, it is essential that it perform a due diligence process to verify that the work of art is as represented. This is true even for works of art that have been previously sold by the same auction house. The due diligence typically requires that the work of art be sent to the same auction house location. Yet, in a case where the artistic work was analyzed by the disclosed systems and methods to produce a digital fingerprint, the work of art can be accurately verified prior to being sent to the auction house. This will provide statistical certainty that all previous due diligence can be relied on. Additionally, the condition of the work can be determined form the digital fingerprint alerting the auction house to any recent defects, damages or changes that impact its value.

Example Use Case 3—Delivery of Art—Presently, there is no reliable way for a buyer to verify that the artistic work they purchased, e.g., at an auction, is the same artistic work that is delivered to them, unless the buyer or an agent of the buyer is permitted to accompany the artistic work throughout the remaining period post-sale until delivery. Such means are impractical and burdensome, at best. However, implementing the disclosed techniques, a buyer of a work of art can associate the bill of sale for that specific work of art as secured within a digital fingerprint. For example, as in use case 3 above, the work of art can be analyzed using the disclosed systems and methods to create and/or authenticate the digital fingerprint; and at the point sale, the fingerprint can be updated to include the purchase information. Further, upon receipt by the buyer, the delivered art work can be again verified by the disclosed systems and methods, e.g., thus avoiding dealers, galleries or other art sellers that unintentionally (or intentionally) try to substitute the work of art for alternates, replicas, copies or fakes.

Example Use Case 4—Insurance Company Proof of Life—As part of the standard process of renewing policies for art, the digital fingerprint can allow owners or agents of the insurance company to prove the existence and state of health of the art. State of Health or condition can provide a key piece of data for any future damage claims. Protecting the authenticity of the condition report is presently not performed, if not even practical. By using the disclosed systems and methods, condition reports can be secured within the digital fingerprint that solely corresponds to the exact artistic work.

Example Use Case 5—Secondary Market Sale Verification—Sometimes art work is exchanged through a secondary market, e.g., owner-to-new-owner sale. Tracking and verifying authenticity is nearly impossible in such situations, as secondary market sales lack so-called responsible third-party brokers, such as auction houses. Yet, by implementing the disclosed systems and methods, a condition of any sale of a work of art can require that the item matches the digital fingerprint that is associated with the established digital audit trail of the item. In such situations, even fakes or copies would have their own unique fingerprint, thus distinguishing them from authentic art works created by the original artist.

Example Use Case 6—Bank Loan Approval—As part of the standard due diligence for non-recourse and recourse loans, implementations of the disclosed systems and methods can allow for banks to require the verification of the digital fingerprint in order to tie to the digital audit trail of the original work of art. For example, the verification itself and subsequent loan could be recorded as a transaction that would be added to the digital audit trail.

Example Use Case 7—Warranty Verification—In various implementations, the digital fingerprint can include a large set of data collected during one or many authentication studies, which can be organized as subsets of the larger data set. In such cases, addition points or spectra may be used for verification of the artistic work. All art service providers that provide any warrantee (on a work, value added service, sale or other transaction) need some form of verification when present with a claim. Typically, this is done without clear proof that the item is the same that was sold. Implementations of the disclosed systems and methods can be used for verification with the digital fingerprint to limit if not prevent instances of warranty fraud and create surety for warranty holders. For example, this can be analogous to the use of a VIN (vehicle identification number) to verify the specific automobile (among all of the same make/models) being transacted or referenced in a service; or this can be analogous to a CUSIP symbol when transacting or servicing another kind of product or security.

In some situations, an artistic work includes a set of several components or pieces, such as a sculpture of a forest having one or more tree sculpture pieces, one or more bush sculpture pieces; a work that is a triptych (e.g., picture or carving on 3 panels); or other multi-component artistic work or object. In such situations, the disclosed systems and methods can create and authenticate a fingerprint unique to each piece of the set, in which each set piece has its own unique reference ID. In such implementations, the disclosed systems and methods can generate a unifying set ID that can be used to reference the individual reference IDs of the set pieces, so that the unifying set ID can provide a user of the system to obtain data in the individual fingerprints associated uniquely to each set piece.

Examples

Various example embodiments in accordance the disclosed technology are described.

In some embodiments in accordance with the disclosed technology (example A1), a method for creating an identification for an object includes acquiring image data of an object in multiple (e.g., two or more) light spectrums along a coordinated array of sample regions of the object; analyzing the acquired image data to produce a quantitative data set including specific characteristics of the object associated with the multiple light spectrums for each sample region; generating a digital identification comprising a unique multi-spectral fingerprint, based on the specific characteristics, in which the digital identification solely corresponds to the object; and storing the generated digital identification.

Example A2 includes the method of example A1, in which the generated digital identification is stored in a database configured to store other digital identifications that solely correspond to other objects.

Example A3 includes the method of example A2, further including storing the acquired image data and processing data comprising data from the produced quantitative data set and processing data artifacts in the database.

Example A4 includes the method of example A1, further including acquiring chemical data from the object using an invasive or a noninvasive chemical sampling technique; and analyzing the acquired chemical data to identify additional characteristics of the object; and modifying the quantitative data set to include the additional characteristics.

Example A5 includes the method of example A1, in which the multiple light spectrums include any of an infrared (IR) spectrum, a visible light spectrum, an ultraviolet (UV) spectrum, or an X-ray spectrum.

Example A6 includes the method of example A1, further including acquiring hyperspectral image data of the object in at least some of the multiple light spectrums along the coordinated array of sample regions; and analyzing the acquired hyperspectral image data to produce hyperspectral data included in the produced quantitative data set.

Example A7 includes the method of example A1, in which the acquired image data includes metadata associated with each acquired image.

Example A8 includes the method of example A7, in which the metadata includes one or more of a date of image acquisition, a time of the image acquisition, a location of the image acquisition, a temperature around the object, or a humidity around the object.

Example A9 includes the method of example A1, in which the coordinated array of sample regions of the object includes a contiguous array of the sample regions across a surface of the object, through a depth of the object, or across a surface and through a depth of the object.

Example A10 includes the method of example A1, in which the coordinated array of sample regions of the object includes a discontiguous array of the sample regions across a surface of the object, through a depth of the object, or across a surface and through a depth of the object.

Example A11 includes the method of example A1, in which the acquiring the image data along the coordinate array of sample regions of the object includes using a multi-dimensional robotic positioning system coupled to an imager.

Example A12 includes the method of example A1, in which the object includes an artistic work comprising a sculpture, drawing, photograph, or printed material.

In some embodiments in accordance with the disclosed technology (example A13), a method for authenticating an object includes acquiring image data of an object in multiple light spectrums at selected sample regions of the object; analyzing the acquired image data to produce a quantitative data set including specific characteristics of the object associated with the multiple light spectrums for each selected sample region; evaluating the quantitative data set produced for the object by comparing with previously-generated digital identifications stored in a database to create a validation score, in which the previously-generated digital identifications each comprise a unique multi-spectral fingerprint based on the specific characteristics analyzed from multi-spectral images of corresponding objects, and in which the validation score is indicative of a sufficiency of data to make a comparison of the quantitative data set with the previously-generated digital identifications; and when the validation score exceeds a predetermined threshold, determining a verdict of authenticity of the object to be authentic, inauthentic, or incomplete as matched to a previously-generated identification, and when the validation score does not exceed the predetermined threshold, repeating the acquiring image data to obtain additional multi-spectral image data.

Example A14 includes the method of example A13, further including storing the acquired image data and processing data comprising data from the produced quantitative data set and processing data artifacts in the database.

Example A15 includes the method of example A13, further including acquiring chemical data from the object using an invasive or a noninvasive chemical sampling technique; and analyzing the acquired chemical data to identify additional characteristics of the object; and modifying the quantitative data set to include the additional characteristics.

Example A16 includes the method of example A13, in which the multiple light spectrums include one or more of an infrared (IR) spectrum, a visible light spectrum, an ultraviolet (UV) spectrum, or an X-ray spectrum.

Example A17 includes the method of example A13, further including acquiring hyperspectral image data of the object in at least some of the multiple light spectrums along the coordinated array of sample regions; and analyzing the acquired hyperspectral image data to produce hyperspectral data included in the produced quantitative data set.

Example A18 includes the method of example A13, in which the acquired image data includes metadata associated with each acquired image.

Example A19 includes the method of example A18, in which the metadata includes one or more of a date of image acquisition, a time of the image acquisition, a location of the image acquisition, a temperature around the object, or a humidity around the object.

Example A20 includes the method of example A13, in which the acquiring the image data along the coordinate array of sample regions of the object includes using a multi-dimensional robotic positioning system coupled to an imager.

Example A21 includes the method of example A13, in which the object includes an artistic work comprising a sculpture, drawing, photograph, or printed material.

In some embodiments in accordance with the disclosed technology (example A22), a system for identifying and authenticating an object includes a data acquisition platform to acquire data from an object; a data processing device, in communication with the data acquisition platform, to analyze the acquired data of the object and produce a quantitative data set including specific characteristics of the object based on the analyzed data, in which the data processing device is configured to identify the object by generating a digital identification based on the specific characteristics that solely corresponds to the object, or to authenticate the object by evaluating the quantitative data set produced for the object by comparing with previously-generated digital identifications to determine an authenticity; and one or more data storage devices, in communication with the data processing device, to store the acquired data and analyzed data.

Example A23 includes the system of example A22, in which the data acquisition platform includes a multi-spectral imaging system configured to acquire image data of the object in multiple light spectrums along a coordinated array of sample regions of the object.

Example A24 includes the system of example A23, in which the system is configured to determine the authenticity by evaluating the quantitative data set produced for the object by comparing with previously-generated digital identifications stored in the one or more data storage devices to create a validation score, in which the previously-generated digital identifications each comprise a unique multi-spectral fingerprint based on the specific characteristics analyzed from multi-spectral images of corresponding objects, and in which the validation score is indicative of a sufficiency of data to make a comparison of the quantitative data set with the previously-generated digital identifications, and when the validation score is determined to exceed a predetermined threshold, determining a verdict of authenticity of the object to be authentic, inauthentic, or incomplete as matched to a previously-generated identification, and when the validation score is determined to not exceed the predetermined threshold, repeating acquisition of image data to obtain additional multi-spectral image data.

Example A25 includes the system of example A22, further including an output device, in communication with the data processing device, to display at least some of the acquired data, the processed data, or both.

Example A26 includes the system of example A22, in which the object includes an artistic work comprising a sculpture, drawing, photograph, or printed material.

In some embodiments in accordance with the disclosed technology (example B1), a method for creating an identification for an object includes acquiring image data of an object in multiple electromagnetic (EM) spectrums along a coordinated array of sample regions of the object; analyzing the acquired image data to produce a quantitative data set that represents specific characteristics of the object associated with the multiple EM spectrums for each sample region; creating a digital fingerprint that includes the quantitative data set, in which the digital fingerprint solely corresponds to the object; generating an identification corresponding to the digital fingerprint, in which the identification includes an alphanumeric string that is displayable as text, graphic, or audio (or any combination thereof) to identify the object; and storing the digital fingerprint and corresponding identification.

Example B2 includes the method of example B1, in which the created digital fingerprint and generated identification are stored in a database, in which the database is also configured to store other identifications and digital fingerprints that solely correspond to other objects.

Example B3 includes the method of example B2, further including storing the acquired image data and additional processing data comprising data artifacts in the database.

Example B4 includes the method of example B1, further including acquiring chemical data from the object using an invasive or a noninvasive chemical sampling technique; and analyzing the acquired chemical data to identify additional characteristics of the object; and modifying the quantitative data set to include the additional characteristics.

Example B5 includes the method of example B1, in which the multiple EM spectrums include two or more of an infrared (IR) spectrum, a visible light spectrum, an ultraviolet (UV) spectrum, or an X-ray spectrum.

Example B6 includes the method of example B1, further including acquiring hyperspectral image data of the object in at least some of the two or more EM spectrums along the coordinated array of sample regions; and analyzing the acquired hyperspectral image data to produce hyperspectral data included in the produced quantitative data set.

Example B7 includes the method of example B1, in which the digital fingerprint includes one or more data blocks that each includes a respective quantitative data set produced from multiple EM spectral images acquired at a particular point in time for each data block.

Example B8 includes the method of example B1, in which the digital fingerprint includes object information including one or more of an owner name of the object, an author or artist name of the object, a country of origin of the object, provenance information about the object, information about materials in the object, an age of the object, or a state of condition of the object.

Example B9 includes the method of example B1, in which the acquired image data includes metadata associated with each acquired image, and in which the digital fingerprint includes the metadata.

Example B10 includes the method of example B9, in which the metadata includes one or more of a date of image acquisition, a time of the image acquisition, a location of the image acquisition, a temperature around the object, or a humidity around the object.

Example B11 includes the method of example B1, in which the coordinated array of sample regions of the object includes a contiguous array of the sample regions across a surface of the object, through a depth of the object, or across a surface and through a depth of the object.

Example B12 includes the method of example B1, in which the coordinated array of sample regions of the object includes a discontiguous array of the sample regions across a surface of the object, through a depth of the object, or across a surface and through a depth of the object.

Example B13 includes the method of example B1, in which the acquiring the image data along the coordinate array of sample regions of the object includes using a multi-dimensional robotic positioning system coupled to an imager.

Example B14 includes the method of example B1, in which the object includes an artistic work comprising a sculpture, drawing, photograph, or printed material.

In some embodiments in accordance with the disclosed technology (example B15), a method for authenticating an object includes acquiring image data of an object in multiple electromagnetic (EM) spectrums at selected sample regions among a coordinated array of sample regions of the object; analyzing the acquired image data to produce a quantitative data set that represents specific characteristics of the object associated with the multiple EM spectrums for each selected sample region; and evaluating the quantitative data set produced for the object by comparing with previously-generated quantitative data sets associated with other objects stored in a database to determine an authenticity of the object to be the same object as one of the other objects, in which the previously-generated quantitative data sets are each included in a digital fingerprint that solely corresponds to the respective other object, in which the previously-generated quantitative data sets each represents specific characteristics analyzed from images acquired in multiple EM spectrums corresponding to the other objects.

Example B16 includes the method of example B15, in which determining the authenticity of the object includes: creating a validation score that is indicative of a sufficiency of data to make a comparison of the quantitative data set with the previously-generated quantitative data sets; comparing the validation score to a predetermined threshold; and when the validation score meets or exceeds the predetermined threshold, determining a verdict of authenticity of the object to be authentic, inauthentic, or incomplete as matched to a previously-generated quantitative data set.

Example B17 includes the method of example B16, in which, when the verdict of authenticity of the object is determined to be authentic as matched to a previously-generated digital fingerprint, the method further includes creating a data block that includes the quantitative data set; adding the created data block to the digital fingerprint corresponding to the matched previously-generated digital fingerprint to update the digital fingerprint; and storing the updated digital fingerprint in the database.

Example B18 includes the method of example B15, in which determining the authenticity of the object includes: creating a validation score that is indicative of a sufficiency of data to make a comparison of the quantitative data set with the previously-generated quantitative data sets; comparing the validation score to a predetermined threshold; and when the validation score does not meet the predetermined threshold, repeating the acquiring image data to obtain additional spectral image data in the multiple EM spectrums.

Example B19 includes the method of example B15, in which the digital fingerprint includes one or more data blocks that each includes a respective quantitative data set produced from multiple EM spectral images acquired at a particular point in time for each data block.

Example B20 includes the method of example B15, further including storing the acquired image data and additional processing data including data artifacts in the database.

Example B21 includes the method of example B15, further including acquiring chemical data from the object using an invasive or a noninvasive chemical sampling technique; and analyzing the acquired chemical data to identify additional characteristics of the object; and modifying the quantitative data set to include the additional characteristics.

Example B22 includes the method of example B15, in which the multiple EM spectrums include two or more of an infrared (IR) spectrum, a visible light spectrum, an ultraviolet (UV) spectrum, or an X-ray spectrum.

Example B23 includes the method of example B15, further including acquiring hyperspectral image data of the object in at least some of the multiple EM spectrums at the at selected sample regions; and analyzing the acquired hyperspectral image data to produce hyperspectral data included in the produced quantitative data set.

Example B24 includes the method of example B15, in which the acquired image data includes metadata associated with each acquired image.

Example B25 includes the method of example B24, in which the metadata includes one or more of a date of image acquisition, a time of the image acquisition, a location of the image acquisition, a temperature around the object, or a humidity around the object.

Example B26 includes the method of example B15, in which the coordinated array of sample regions of the object includes a contiguous array of the sample regions across a surface of the object, through a depth of the object, or across a surface and through a depth of the object.

Example B27 includes the method of example B15, in which the coordinated array of sample regions of the object includes a discontiguous array of the sample regions across a surface of the object, through a depth of the object, or across a surface and through a depth of the object.

Example B28 includes the method of example B15, in which the acquiring the image data along the coordinate array of sample regions of the object includes using a multi-dimensional robotic positioning system coupled to an imager.

Example B29 includes the method of example B15, in which the object includes an artistic work comprising a sculpture, drawing, photograph, or printed material.

In some embodiments in accordance with the disclosed technology (example B30), a system for identifying and authenticating an object includes an image data acquisition platform to acquire image data from an object in multiple electromagnetic (EM) spectrums along a coordinated array of sample regions of the object; a data processing device, in communication with the image data acquisition platform, to analyze the acquired image data of the object and produce a quantitative data set that represents specific characteristics of the object associated with the multiple EM spectrums for each sample region, in which the data processing device is configured to (i) identify the object by creating a digital fingerprint that solely corresponds to the object and includes the quantitative data set, and generate an identification corresponding to the digital fingerprint, in which the identification includes an alphanumeric string that is displayable as text, graphic, or audio to identify the object, or (ii) authenticate the object by evaluating the quantitative data set produced for the object by comparing with previously-generated quantitative data sets corresponding to other objects in order to determine an authenticity of the object to be the same object as one of the other objects; and one or more data storage devices, in communication with the data processing device, to store the acquired data and analyzed data.

Example B31 includes the system of example B30, in which the system is configured to determine the authenticity by evaluating the quantitative data set produced for the object by comparing with the previously-generated quantitative data sets corresponding to the other objects stored in the one or more data storage devices to create a validation score, in which the previously-generated quantitative data sets are each included in a digital fingerprint that solely corresponds to the respective other object, and in which the validation score is indicative of a sufficiency of data to make a comparison of the quantitative data set with the previously-generated quantitative data sets.

Example B32 includes the system of example B31, in which the system is configured to compare the validation score to a predetermined threshold to determine whether the validation score exceeds the predetermined threshold, and when the validation score is determined to exceed the predetermined threshold, the system is configured to determine a verdict of authenticity of the object to be authentic, inauthentic, or incomplete as matched to a previously-generated quantitative data sets.

Example B33 includes the system of example B31, in which the system is configured to compare the validation score to a predetermined threshold to determine whether the validation score exceeds the predetermined threshold, and when the validation score is determined to not exceed the predetermined threshold, the system is configured to repeat acquisition of the image data to obtain additional spectral image data in the multiple EM spectrums.

Example B34 includes the system of example B30, in which the digital fingerprint includes one or more data blocks each comprising a quantitative data set produced for a multiple EM spectral imaging data set acquired at a particular point in time.

Example B35 includes the system of example B30, in which the digital fingerprint includes object information including one or more of an owner name of the object, an author or artist name of the object, a country of origin of the object, provenance information about the object, information about materials in the object, an age of the object, or a state of condition of the object.

Example B36 includes the system of example B30, further including an output device, in communication with the data processing device, to display at least some of the acquired data, the processed data, or both.

Example B37 includes the system of example B30, in which the output device includes one or more of a smartphone, a tablet, a wearable computing device, or a personal computer including a desktop or laptop computer.

Example B38 includes the system of example B30, in which the object includes an artistic work comprising a sculpture, drawing, photograph, or printed material.

Example B39 includes the system of example B30, in which the image data acquisition platform includes a multi-dimensional robotic positioning system coupled to an imager to acquire the image data along the coordinate array of sample regions of the object.

Example B40 includes the system of example B39, in which the image data acquisition platform includes a lighting bracket coupled to the robotic positioning system that moves with the imager to ensure the same lighting conditions for each image acquired along the coordinate array of sample regions of the object.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

The disclosed system and methods address device-centric challenges of examining physical properties of materials and tangible objects, with some examples including paintings, sculptures, drawings and other artistic works and high-end articles. Aspects of the disclosed methods are necessarily rooted in computer technology to specifically overcome problems of identifying, characterizing and classifying unique physical features of such materials and objects, as well as to improve the functioning of the analysis instruments, by using computerized analytical processing techniques.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for creating an identification for an object, comprising:
   acquiring image data of an object in multiple electromagnetic (EM) spectrums along a coordinated array of sample regions of the object;
   analyzing the acquired image data to produce a quantitative data set that represents specific characteristics of the object associated with the multiple EM spectrums for each sample region;
   creating a digital fingerprint that includes the quantitative data set, wherein the digital fingerprint solely corresponds to the object;
   generating an identification corresponding to the digital fingerprint, wherein the identification includes an alphanumeric string that is displayable as text, graphic, or audio to identify the object; and
   storing the digital fingerprint and corresponding identification.

2. The method of claim 1, wherein the created digital fingerprint and generated identification are stored in a database, wherein the database is also configured to store other identifications and digital fingerprints that solely correspond to other objects.

3. The method of claim 2, further comprising:
   storing the acquired image data and additional processing data comprising data artifacts in the database.

4. The method of claim 1, further comprising:
   acquiring chemical data from the object using an invasive or a noninvasive chemical sampling technique; and
   analyzing the acquired chemical data to identify additional characteristics of the object; and
   modifying the quantitative data set to include the additional characteristics.

5. The method of claim 1, wherein the multiple EM spectrums include two or more of an infrared (IR) spectrum, a visible light spectrum, an ultraviolet (UV) spectrum, or an X-ray spectrum.

6. The method of claim 1, further comprising:
   acquiring hyperspectral image data of the object in at least some of the two or more EM spectrums along the coordinated array of sample regions; and
   analyzing the acquired hyperspectral image data to produce hyperspectral data included in the produced quantitative data set.

7. The method of claim 1, wherein the digital fingerprint includes one or more data blocks that each includes a respective quantitative data set produced from multiple EM spectral images acquired at a particular point in time for each data block.

8. The method of claim 1, wherein the digital fingerprint includes object information including one or more of an owner name of the object, an author or artist name of the object, a country of origin of the object, provenance information about the object, information about materials in the object, an age of the object, or a state of condition of the object.

9. The method of claim 1, wherein the acquired image data includes metadata associated with each acquired image, and wherein the digital fingerprint includes the metadata.

10. The method of claim 9, wherein the metadata includes one or more of a date of image acquisition, a time of the image acquisition, a location of the image acquisition, a temperature around the object, or a humidity around the object.

11. The method of claim 1, wherein the coordinated array of sample regions of the object includes a contiguous array of the sample regions across a surface of the object, through a depth of the object, or across a surface and through a depth of the object.

12. The method of claim 1, wherein the coordinated array of sample regions of the object includes a discontiguous array of the sample regions across a surface of the object, through a depth of the object, or across a surface and through a depth of the object.

13. The method of claim 1, wherein the acquiring the image data along the coordinate array of sample regions of the object includes using a multi-dimensional robotic positioning system coupled to an imager.

14. The method of claim 1, wherein the object includes an artistic work comprising a painting, a sculpture, a drawing, a photograph, or a printed material.

15. A system for identifying and authenticating an artistic work, comprising:
- an image data acquisition platform to acquire image data from an artistic work in multiple electromagnetic (EM) spectrums along a coordinated array of sample regions of the artistic work;
- a data processing device, in communication with the image data acquisition platform, to analyze the acquired image data of the artistic work and produce a quantitative data set that represents specific characteristics of the artistic work associated with the multiple EM spectrums for each sample region,
  wherein the data processing device is configured to (i) identify the artistic work by creating a digital fingerprint that solely corresponds to the artistic work and includes the quantitative data set, and generate an identification corresponding to the digital fingerprint, wherein the identification includes an alphanumeric string that is displayable as text, graphic, or audio to identify the artistic work, or (ii) authenticate the artistic work by evaluating the quantitative data set produced for the artistic work by comparing with previously-generated quantitative data sets corresponding to other artistic works in order to determine an authenticity of the artistic work to be the same artistic work as one of the other artistic works;
- one or more data storage devices, in communication with the data processing device, to store the acquired data and analyzed data; and
- an output device, in communication with the data processing device, to display at least some of the acquired data, the processed data, or both.

16. The system of claim 15, wherein the artistic work comprises a painting, a sculpture, a drawing, a photograph, or a printed material.

17. The system of claim 15, wherein the digital fingerprint includes one or more data blocks each comprising a quantitative data set produced for a multiple EM spectral imaging data set acquired at a particular point in time.

18. The system of claim 15, wherein the digital fingerprint includes artistic work information including one or more of an owner name of the artistic work, an author or artist name of the artistic work, a country of origin of the artistic work, provenance information about the artistic work, information about materials in the artistic work, an age of the artistic work, or a state of condition of the artistic work.

19. The system of claim 15, wherein the output device includes one or more of a smartphone, a tablet, a wearable computing device, or a personal computer including a desktop or laptop computer.

20. The system of claim 15, wherein the image data acquisition platform includes a multi-dimensional robotic positioning system coupled to an imager to acquire the image data along the coordinate array of sample regions of the artistic work.

* * * * *